(12) United States Patent
Galermo

(10) Patent No.: US 12,436,153 B2
(45) Date of Patent: Oct. 7, 2025

(54) METHODS, COMPOSITIONS, AND KITS FOR HIGH-THROUGHPUT RELEASE, LABELING, AND ANALYSIS OF O-GLYCANS PRESENT ON A GLYCOCONJUGATE

(71) Applicant: Agilent Technologies, Inc., Santa Clara, CA (US)

(72) Inventor: Ace Gita Galermo, Greenfield, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 800 days.

(21) Appl. No.: 17/781,283

(22) PCT Filed: Dec. 10, 2020

(86) PCT No.: PCT/US2020/064337
§ 371 (c)(1),
(2) Date: May 31, 2022

(87) PCT Pub. No.: WO2021/119333
PCT Pub. Date: Jun. 17, 2021

(65) Prior Publication Data
US 2022/0412985 A1    Dec. 29, 2022

Related U.S. Application Data

(60) Provisional application No. 62/948,068, filed on Dec. 13, 2019.

(51) Int. Cl.
*B01L 3/00* (2006.01)
*B01D 15/08* (2006.01)
(Continued)

(52) U.S. Cl.
CPC .......... *G01N 33/6842* (2013.01); *G01N 33/58* (2013.01); *G01N 2400/12* (2013.01); *G01N 2440/38* (2013.01)

(58) Field of Classification Search
CPC ............... G01N 33/6842; G01N 33/58; G01N 2400/12; G01N 2440/38; G01N 2400/00
See application file for complete search history.

(56) References Cited

U.S. PATENT DOCUMENTS

2014/0024124 A1 * 1/2014 Shinohara .......... G01N 30/7233
548/366.1

FOREIGN PATENT DOCUMENTS

EP          2305692 A1 *  4/2011   ......... G01N 33/6848
WO    WO 2011/038874 A1    4/2011

OTHER PUBLICATIONS

Maniatis et al., Rapid De-O-glycosylation Concomitant with Peptide Labeling Using Microwave Radiation and an Alkyl Amine Base, Anal Chem, 2010, pp. 2421-2425, vol. 82(6).
(Continued)

*Primary Examiner* — Jennifer Wecker
*Assistant Examiner* — Oyeleye Alexander Alabi
(74) *Attorney, Agent, or Firm* — Laurence J. Hyman; Hyman IP Law

(57) ABSTRACT

The present disclosure provides methods, compositions, and kits for the rapid release, labeling, and detection of O-glycans present on a glycoconjugate, such as a glycoprotein, glycopeptide, peptidoglycan, or proteoglycan of interest. The compositions and methods allow the released O-glycans to be subjected to high-throughput analysis.

20 Claims, 13 Drawing Sheets

Legend
◆ NeuAc
○ Gal
▢ GalNAc
▨ GlcNAc

(51) Int. Cl.
| | | |
|---|---|---|
| B01F 33/302 | (2022.01) | |
| B01F 33/3033 | (2022.01) | |
| B01J 20/285 | (2006.01) | |
| B01J 20/287 | (2006.01) | |
| B01J 20/32 | (2006.01) | |
| B01L 7/00 | (2006.01) | |
| B01L 9/00 | (2006.01) | |
| B65G 47/80 | (2006.01) | |
| B82Y 20/00 | (2011.01) | |
| B82Y 30/00 | (2011.01) | |
| B82Y 40/00 | (2011.01) | |
| C12M 1/34 | (2006.01) | |
| C12M 3/06 | (2006.01) | |
| C12N 1/14 | (2006.01) | |
| C12N 1/20 | (2006.01) | |
| C12Q 1/02 | (2006.01) | |
| C12Q 1/6806 | (2018.01) | |
| C12Q 1/6844 | (2018.01) | |
| C12Q 1/6848 | (2018.01) | |
| C12Q 1/686 | (2018.01) | |
| G01N 15/10 | (2024.01) | |
| G01N 15/14 | (2024.01) | |
| G01N 15/1433 | (2024.01) | |
| G01N 21/29 | (2006.01) | |
| G01N 21/65 | (2006.01) | |
| G01N 30/02 | (2006.01) | |
| G01N 30/60 | (2006.01) | |
| G01N 30/72 | (2006.01) | |
| G01N 33/543 | (2006.01) | |
| G01N 33/557 | (2006.01) | |
| G01N 33/574 | (2006.01) | |
| G01N 33/58 | (2006.01) | |
| G01N 33/68 | (2006.01) | |

(56) References Cited

OTHER PUBLICATIONS

Furukawa, et al., A Versatile Method for Analysis of Serine/Threonine Posttranslational Modifications by β-Elimination in the Pre. , Analyt Chem, 2011, pp. 9060-9067, v 83.

Kisiel, et al, Application of aqueous hydrazine solution for B-elimination of O-glycans from gastric mucin, Acta Biochim Polonica, 1999. p. 753-757. v.46(3).

Zauner, et al., Mass spectrometric O-glycan analysis after combined O-glycan release by beta-elimination and 1-phenyl-3-, Biochim Biophys Acta. 2012. pp. 1420-1428. v. 1820.

Wang, et al., One-pot nonreductive O-glycan release and labeling with 1-phenyl-3-methyl-5-pyrazolone followed by ESI-MS analysis, Proteomics. 2011. pp. 4229-4242. v. 11.

Carlson, Structures and Immunochemical Properties of Oligosaccharides Isolated from Pig Submaxillary Mucins, J Biol Chem, 1968. pp. 616-676. v. 243(3).

Merry, et al., Recovery of Intact 2-Aminobenzamide-Labeled O-Glycans Released from Glycoproteins by Hydrazinolysis. Anal Biochem, 2002, pp. 91-99, v 304(1).

Cooper, et al., The elimination of O-linked glycans from glycoproteins under non-reducing conditions, Glycoconjugate J , 1994. pp. 163-167, v. 11.

Kisiel, D.G., et al., "Application of the 50% Hydrazine Solution Method for O-glycans Release, their Chemical Labeling, and HPLC . . . " Toxicol Mech and Meth, 2008, 503-7, 18 (6).

Malkova, A., International Search Report for PCT/US2020/064337, Mar. 11, 2021, ISA/RU.

Malkova, A., Written Opinion of the Intl Searching Authority for PCT/US2020/064337, Mar. 11, 2021, ISA/RU.

\* cited by examiner

METHODS, COMPOSITIONS, AND KITS FOR HIGH-THROUGHPUT RELEASE, LABELING, AND ANALYSIS OF O-GLYCANS PRESENT ON A GLYCOCONJUGATE

CROSS-REFERENCE TO RELATED APPLICATIONS

This application is a national stage application under 35 U.S.C. § 371 of International Application No. PCT/US2020/064,337, filed Dec. 10, 2020, which claims the benefit of, and priority to, U.S. Provisional Patent Application No. 62/948,068, filed Dec. 13, 2019. The contents of each of these applications are incorporated herein by reference for all purposes.

STATEMENT OF FEDERAL FUNDING

Not applicable.

BACKGROUND OF THE INVENTION

This invention relates to the field of the release and analysis of O-glycans present on glycoproteins or glycopeptides.

Many of the proteins or peptides produced by eukaryotic cells are modified after translation by the addition of moieties such as lipids or carbohydrates, or by phosphorylation. These modifications can significantly affect the properties of the modified protein or peptide.

One important group of such post-translational modification is the addition of covalently-linked, linear or branched chains of carbohydrates. Protein-carbohydrate conjugates are referred to as glycoproteins, while peptides with attached carbohydrates are referred to as glycopeptides. The point at which the carbohydrate is attached to the protein or peptide is referred to as a glycosylation site. Attached polysaccharides and oligosaccharides are sometimes referred to herein as glycans. N-glycans are defined as those attached to the protein or peptide through the nitrogen of an asparagine residue, while O-glycans are defined as those attached to the protein or peptide through the hydroxyl oxygen of serine, threonine, tyrosine, hydroxylysine, or hydroxyproline sidechains.

The particular pattern of glycans on a particular glycoprotein or glycopeptide is determined by the specific cell line that produced the protein or peptide and the conditions under which the cells were grown. Since the glycans conjugated to a protein or peptide can affect characteristics critical to its function, including pharmacokinetics, stability, bioactivity, or immunogenicity, in many uses it is important to determine which glycans are present. For example, the Food and Drug Administration requires characterization of carbohydrates attached to therapeutic glycoproteins and vaccines to show composition of matter and consistency of manufacture, resulting in a need for extensive characterization of the product. Analysis of the profile of the carbohydrates is also important for quality control in the production of recombinant proteins or peptides, in which a change in carbohydrate profile may indicate stress in the system, which if not corrected in time may require a commercial-scale fermenter of expensive protein to be discarded.

Current methods for determining which glycans are present on a glycoprotein or glycopeptide of interest typically rely on releasing the glycans from the protein component, a process referred to as "deglycosylation." Many N-glycans can conveniently be released from glycoproteins or glycopeptides under mild conditions by enzymatic cleavage by various enzymes, such as PNGase F (Peptide-N4-(acetyl-β-glucosaminyl)-asparagine amidase, EC 3.5.1.52.). Enzymatic digestion of N-glycans, such as by PNGase F, typically occurs in an aqueous solution, and results in the initial release of the N-glycans as β-glycosylamines, in which the free-reducing end of the released glycan is conjugated with ammonia (see, e.g., Tarentino, et al. TIGG 1993, 23, 163-170; Rasmussen J. R. J. Am. Chem. Soc. 1992, 114, 1124-1126; Risley, et al. J. Biol. Chem. 1985, 260, 15488-15494, 1985).

Unfortunately, only limited means of releasing O-glycans by enzymes are available. The disaccharide Gal-β(1,3) Gal-NAc, can be released enzymatically by the enzyme O-Glycosidase, but, in general, there are no enzymatic means of releasing intact O-glycans with branching chains. A number of methods have been developed which release these more complex O-glycans by use of chemicals. Once the O-glycans have been released from the glycoprotein or glycopeptide, they are typically labeled at their reducing terminus, subjected to high pressure liquid chromatography to separate the labeled glycans, and analyzed to determine the types and amounts of glycans released from the glycoprotein or glycopeptide of interest.

Many of these chemical deglycosylation techniques involve chemical deglycosylation of a relatively high amount of starting sample under relatively harsh conditions. A relatively early protocol for releasing O-glycans, for example, called for incubation with trifluoro-methanesulfonic acid at 0° C. for 0.5 to 2 hours, followed by the neutralization of the acid with aqueous pyridine at −20° C. The Carlson method, which many consider the gold standard for releasing and analyzing O-glycans, dates from the late 1960s, and relies on beta-elimination, that is, the release of O-glycans under basic conditions, using sodium hydroxide in combination with reduction using sodium borohydride, incubation at 45° C. for 14-16 hours, and solid-phase extraction to enrich the glycans for analysis by liquid chromatography-mass spectrometry ("LC-MS"). See, e.g., Carlson, D., J. Biol. Chem., 243:616-626 (1968). The Maniatis method requires 1+ milligram of glycoprotein and relies on beta-elimination using dimethylamine, microwave radiation at 70° C. for 70 minutes, and permethylation of hydroxyl groups for analysis by matrix-assisted laser desorption ionization mass spectrometry (MALDI-MS). See, e.g., Maniatis, et al., Anal. Chem. 82:2421-2425 (2010). The Merry et al. method uses hydrazine, a toxic and unstable compound when in anhydrous form, requires >40 μg of glycoprotein, causes unwanted removal of acetyl groups that may be present in the O-glycan core, incubation at 60° C. for 6 hours, and additional steps of re-acetylation and reducing-end labeling with a fluorophore. See, e.g., Merry et al., Anal. Biochem. 304:91-99 (2002). Others reported using releasing O-glycans using a combination beta-elimination, 50% hydrazine solution with 0.2M triethylamine, followed by labeling with para-amino benzooic acid ethyl ester, and found good results with an optimal incubation time of 48 hours. See, Kisiel et al., Toxicology Mechanisms and Methods, 18:503-07 (2008); Kisiel et al., Acta Biochemica Polonica, 1999, 46(3):753-757.

In addition to these methods, several "one-pot" procedures have been developed. One 15 such one-pot approach uses beta-elimination with dimethylamine in combination with reducing-end labeling with 1-phenyl-3-methyl-5-pyrazolone, or "PMP". The method calls for the incubation of a very small sample, on the order of 5 μg, with 40% dimethylamine in 0.5 M PMP in methanol at 85° C. for 2 hours, followed by a dry-down of sample and solid-phase extraction of the released glycans to concentrate them for analysis for liquid chromatography-mass spectrometry (LC-MS). See, e.g., Zauner et al., Biochim Biophys. Acto. 1820:1420-1428 (2012) (hereafter, "Zauner"). Wang et al. (Proteonomics 11:4229-4242 (2011)) and Furukawa et al. (Anal. Chem, 83:9060-9067 (2011)) are other one-pot beta elimination approaches for releasing O-glycans and labeling them with PMP. Wuhrer et al. teach what they assert is "a one-pot process for releasing and labeling O-glycans from glycoproteins . . . comprising contacting the glycoprotein with an amine, eg, methylamine, dimethylamine, or ammonia, NH3 in the presence of a labeling agent." Abstract, Wuhrer et al., WO 2011/038874.

There remains a need for additional methods for releasing and analyzing O-glycans attached to glycoproteins or glycopeptides that require only small sample volumes, moderate reaction conditions, and short incubation times and that can be adapted for high-throughput analysis. Surprisingly, the present invention meets these and other needs.

SUMMARY OF THE INVENTION

In a first group of embodiments, the invention provides methods for releasing, labeling, and, optionally, analyzing, O-glycans present on a selected glycoconjugate of interest, comprising: incubating in a container the selected glycoconjugate of interest in an aqueous solution comprising 1.20M-2M triethylamine ("TEA"), and 0.20M to 1.25M 1-phenyl-3-methyl-5-pyrazolone ("PMP") at a temperature of 70-100° C. for a time between 10 minutes and 23 hours. In some embodiments, the selected glycoconjugate of interest is present in the solution in an amount between 4 μg and 200 μg. In some embodiments, the selected glycoconjugate of interest is present in the solution in an amount between 4 μg and 100 μg. In some embodiments, the selected glycoconjugate of interest is present in the solution in an amount between 5 μg and 50 μg. In some embodiments, the selected glycoconjugate of interest is present in the solution in an amount of 40 μg±10 μg. In some embodiments, the glycoconjugate of interest is present in said solution in an amount of 40 μg. In some embodiments, the selected glycoconjugate of interest is a glycoprotein or a glycopeptide. In some embodiments, the selected glycoprotein or glycopeptide is a glycoprotein. In some embodiments, the TEA is present in the solution at 1.45M±0.1M. In some embodiments, the TEA is present in the solution at 1.45M±0.05M. In some embodiments, the TEA is present in 15 the solution at 1.45M. In some embodiments, the PMP is present in the solution at 0.40M -0.55M. In some embodiments, the PMP is present in the solution at 0.50M±0.1M. In some embodiments, the PMP is present in the solution at 0.50M. In some embodiments, the TEA is present in the solution at 1.45M and the PMP is present in the solution at 0.50M. In some embodiments, the selected glycoconjugate is present in the solution in an amount of 40 μg ±10 μg. In some embodiments, the aqueous solution contains no more than 5% hydrazine. In some embodiments, the aqueous solution contains no hydrazine. In some embodiments, the time of incubation is 10-30 minutes. In some embodiments, the time of incubation is 10 minutes±1 minute. In some embodiments, the time of incubation is 10 minutes±30 seconds. In some embodiments, the time of incubation is 10 minutes. In some embodiments, the time of incubation is 15-23 hours. In some embodiments, the time of incubation is 15 hours±30 minutes. In some embodiments, the temperature at which the solution is incubated is at or above 90° C. and the container is capped. In some embodiments, the temperature at which the solution is incubated is 70-90° C. In some embodiments, the temperature at which the solution is incubated is 80° C.±5° C. In some embodiments, the temperature at which the solution is incubated is 80° C. In some embodiments, the container is a multi-well plate. In some embodiments, the multi-well plate is a 96-well plate. In some embodiments, the methods further comprise analyzing the released, labeled O-glycans. In some of these embodiments, the analysis comprises separating the released, labeled O-glycans by liquid chromatography. In some embodiments, the analysis comprises analyzing the released, labeled O-glycans by mass spectrometry. In some embodiments, the analysis comprises separating the released, labeled O-glycans by liquid chromatography and then analyzing the separated, released and labeled O-glycans by mass spectrometry.

In another group of embodiments, the invention provides compositions comprising a selected glycoconjugate of interest and an aqueous solution comprising 1.20M-2M triethylamine ("TEA"), and 0.20M to 1.25M 1-phenyl-3-methyl-5-pyrazolone ("PMP"). In some embodiments, the selected glycoconjugate of interest is a glycoprotein or a glycopeptide. In some embodiments, the glycoprotein or glycopeptide is a glycoprotein. In some embodiments, the TEA is present in the solution at 1.45M ±0.1M. In some embodiments, the TEA is present in the solution at 1.45M ±0.05M. In some embodiments, the TEA is present in the solution at 10 1.45M. In some embodiments, the PMP is present in the solution at 0.40M -0.55M. In some embodiments, the PMP is present in the solution at 0.50M±0.1M. In some embodiments, the PMP is present in the solution at 0.50M. In some embodiments, the TEA is present in the solution at 1.45M and the PMP is present in the solution at 0.50M. In some embodiments, the selected glycoconjugate of interest is present in the solution in an amount of 40 μg±10 μg. In some embodiments, the aqueous solution contains no more than 5% hydrazine. In some embodiments, the aqueous solution contains no hydrazine.

In a further group of embodiments, the invention provides kits for releasing, labeling, and, optionally, analyzing, O-glycans present on a selected glycoconjugate of interest, said kit comprising: (a) a container, (b) triethylamine ("TEA"), and (c) 1-phenyl-3-methyl-5-pyrazolone ("PMP"). In some embodiments, the kit further comprises: (d) one or more O-glycans in known amounts for use as standards. In some embodiments, the kit further comprises: (e) one or more multi-well plates.

BRIEF DESCRIPTION OF THE DRAWINGS

FIG. 6 graph II is a graph showing the relative peak area of O-glycans reacted under identical conditions except for the indicated molarity of TEA. Coefficient of variation was determined to be <3.9% for each glycan for the 0.95 M and 1.45 M TEA conditions. Both graphs: Reactions were performed by reacting 40 µg glycoprotein in 0.5 M PMP dissolved in 30 0.45-2.95 M TEA at 80° C. Samples were prepared in triplicate and a reaction time of 30 minutes was performed. Percentage values above each data bar corresponds to percent coefficient of variation. Error bars represent standard deviation.

FIG. 7 graph II presents the relative individual glycan composition of O-glycans released from 40 µg of glycoprotein in 1.45M TEA at 80° C. in the presence of different concentrations of PMP. Both graphs: Samples were prepared in triplicate and 30 minutes was used as the reaction time. Percentage values above each data bar corresponds to percent coefficient of variation. Error bars represent standard deviation.

FIG. 8 graph I presents the absolute individual glycan composition of O-glycans released from the glycoprotein in 1.45M TEA at 80° C. and labeled by PMP in volumes of reaction solution ranging from 20 to 100 microliters. FIG. 8 graph II presents the relative individual glycan composition of O-glycans released and labeled under the same conditions. Both graphs: Samples were prepared in triplicate and 30 minutes was used as the reaction time. Percentage 15 values above each data bar corresponds to percent coefficient of variation. Error bars represent standard deviation.

FIG. 9 graph II presents the relative individual glycan composition of O-glycans released and labeled over the same periods of time under the same reaction conditions. Both graphs: Samples were prepared in triplicate and a reaction time range from 30 minutes to 23 hours was used as the reaction time. Error bars represent standard deviation FIG. 10 graph I presents the absolute peak area sum of glycans A, B and C, D, and E released over periods of time ranging from 5 to 30 minutes from 40 µg of glycoprotein in a solution of 0.5 PMP dissolved in 1.45M TEA at 80° C. FIG. 10 graph II presents the relative glycan composition of the same O-glycans released and labeled over the same periods of time under the same reaction conditions. Both graphs: Samples were prepared in triplicate and reaction times from 5 minutes to 30 minutes were examined Error bars represent standard deviation. ND=not detected.

DETAILED DESCRIPTION

Introduction

Figure 1:
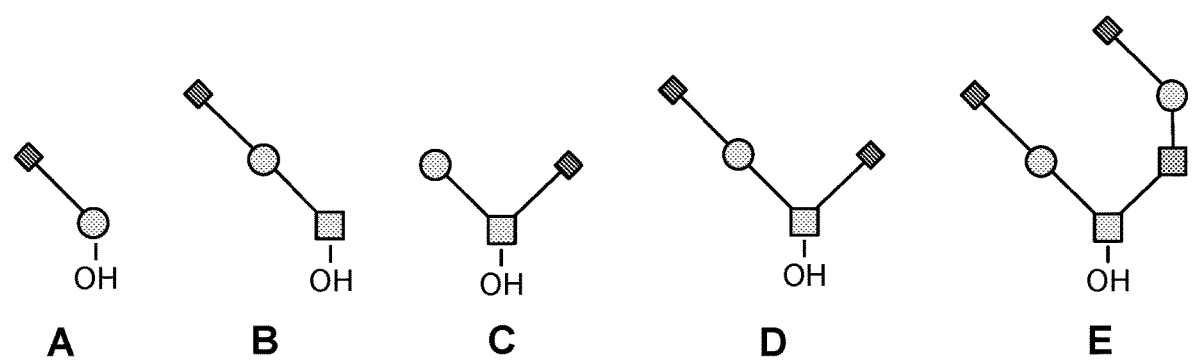
FIG. 1 shows O-glycan structures of bovine fetuin in their released reducing-end form. A total of four intact O-glycan structures, corresponding to compounds labeled B, C, D, and E, can be generated by beta-elimination. Compound A is an unwanted "peeling" by-product of beta-elimination and is derived by degradation of compounds B, C, D, and/or E.

As stated in the Background section, the particular post translational modifications on a protein or peptide can significantly affect characteristics critical to its function. Accordingly, it is important in many therapeutic and industrial uses to determine which post translational modifications are present on a protein or peptide whose biological activity is of interest.

One exemplar post translational modification is the addition of one or more carbohydrate moieties, or glycans, to the protein or peptide. Current protocols for determining the glycans present on a protein or peptide typically involve releasing the glycans from the glycoprotein or glycopeptide, labeling the released glycans, and then analyzing the labeled glycans to determine which are present and in what relative or absolute quantities. N-glycans can generally be released by enzymatic digestion under mild conditions. Unfortunately, while some simple O-glycans can be released by enzymatic digestion, analyzing more complex O-glycans typically requires releasing them with strong bases or, more commonly, anhydrous hydrazine, a highly toxic and unstable chemical, under relatively harsh conditions.

Surprisingly, the inventive methods provide simple procedures for releasing and labeling for analysis the O-glycans present on a glycoprotein, glycopeptide, peptidoglycan, or proteoglycan of interest without the need for strong bases or the hazardous chemical hydrazine. (As this disclosure focuses on the release and labeling of O-glycans, references below to "glycans" refer to O-glycans unless otherwise specified or required by context.) Studies underlying the present disclosure show that the inventive methods provide a surprising combination of advantages over previous methods available in the art for releasing and labeling O-glycans from a glycoprotein, glycopeptide, peptidoglycan, or proteoglycan of interest:

(1) They can be performed in a single container (a so-called "one-pot" procedure).
(2) They can be performed on small amounts of the glycoprotein, glycopeptide, peptidoglycan, or proteoglycan of interest, in small volumes of reagents. This allows the release and labeling to be performed in a small container, such as the well of a multi-well plate, and thus the inventive methods can be used in high-throughput screening.
(3) As the glycan release and labeling can be performed in a single step in a single container, they are relatively easy to automate.
(4) They allow surprisingly fast identification of O-glycans present in the sample. While release of all the O-glycans in the sample takes approximately 15 hours, studies of glycans released from an exemplar glycoprotein after the glycoprotein was added to the deglycosylation and labeling reagents showed that the relative proportions of the glycans released from the glycoprotein changed less than 10% starting from as little as 10 minutes after the glycoprotein was added to the reagents to 24 hours. While these results were obtained with a glycoprotein, it is expected that similar results will obtain with a glycoprotein, glycopeptide, peptidoglycan, or proteoglycan of interest. Thus, analyzing the released and labeled O-glycans after 30 minutes provides the practitioner with an answer if the practitioner wants to know which O-glycans are present on the glycoprotein, glycopeptide, peptidoglycan, or proteoglycan of interest, and in what relative quantities, while analyzing them at or after 15 hours allows the practitioner to quantitate the O-glycans present.
(5) They do not require the use of inert gases, a drying down step or a solid phase extraction step to concentrate the labeled glycans before providing them to an analytic means, or a separate labeling step, and
(6) They can be performed without the use of hydrazine or the strong bases that have been used in many of the previous protocols for releasing and labeling O-glycans.

In sum, the inventive methods provide a surprisingly more convenient, faster, and safer, means of releasing, labeling, and analyzing, O-glycans present on a glycoprotein, glycopeptide, peptidoglycan, or proteoglycan of interest than the methods that have been developed and available in the art over the past 50 years. For convenience of reference, the phrase "the selected glycoconjugate" is sometimes used herein to refer to a member of the group consisting of glycoproteins, glycopeptides, peptidoglycans, and proteoglycans. For convenience of reference, reference herein to "glycoproteins" also includes "glycopeptides" unless otherwise specified or required by context.

As noted in the Background section, Wuhrer et al., WO 2011/038874, teaches what it characterizes as "a one-pot process for releasing and labeling O-glycans from glycoproteins . . . comprising contacting the glycoprotein with an amine, eg, [sic] methylamine, dimethylamine, or ammonia, NH3 [sic] in the presence of a labeling agent." See, Abstract, and page 3. However, all of the amines that Wuhrer et al. teach as suitable for use in their procedure are primary and secondary amines A person of skill in the art of releasing and labeling O-glycans would be aware, however, that primary and secondary amines attack O-glycans upon their release from the glycoproteins, and therefore would reduce the O-glycans available to be labeled by a label, such as PMP. They are therefore not in fact suitable for use in one-pot O-glycan release and labeling procedures. Perhaps that is one reason that the art has not adopted an amine-based, one pot procedure in the almost 10 years since the Wuhrer et al. PCT application was published, despite the fact that no patent ever issued in any jurisdiction from that PCT application.

Triethylamine ("TEA") and
1-phenyl-3-methyl-5-pyrazolone ("PMP")

Triethylamine, or "TEA," CAS number 121-44-8, is an organic compound commonly used as a base in organic syntheses. The abbreviation "TEA" is also used in organic chemistry to refer to several other organic compounds; in this disclosure, however, "TEA" refers exclusively to triethylamine unless otherwise stated. TEA, along with other ammonium bases such as ammonium hydroxide (NH4OH) and dimethylamine, or "DMA," have been used before as bases in procedures to release and label O-glycans. The prior reports of the use of TEA in O-glycan release and labeling, however, reported using it at 0.2M in a 50% solution of hydrazine. See, Kisiel et al., Toxicology Mechanisms and Methods, 18:503-07 (2008); Kisiel et al., Acta Biochemica Polonica, 1999, 46(3):753-757. Surprisingly, studies underlying the present disclosure found that the toxic compound hydrazine is not needed in releasing and labeling O-glycans from a glycoprotein, and thus make the release and labeling process safer and, by eliminating a reagent, potentially less expensive. Further, whereas the reports by Kisiel reported good results in releasing and labeling O-glycans after 48 hours of incubation, the inventive methods allow determination of the relative glycan profile of the glycoprotein in as little as 10 minutes and determination of the absolute glycan profile in as little as 15 hours. The inventive methods and compositions preferably do not contain any hydrazine in the solution in which the glycoprotein, glycopeptide, peptidoglycan, or proteoglycan whose glycan profile is desired to be known (the "glycoprotein, glycopeptide, peptidoglycan, or proteoglycan of interest") is incubated with TEA and a label or, if hydrazine is present in the solution, do not contain hydrazine at a concentration of more than a few percent, such as 5%.

Studies underlying the present disclosure also demonstrated that TEA was a surprisingly better base for O-glycan release and labeling methods than $NH_4OH$ or dimethylamine ("DMA"). First, it resulted in an increased yield of labeled glycans compared to the use of primary or secondary amines As shown in the Examples, use of NH4OH resulted in the lowest amount of release of the glycans compared to either the secondary or the tertiary amines. Second, it provided consistent results, while DMA provided variable signals depending on whether the release and labeling reactions were stopped ("quenched") by dilution with water or by the addition of an acid. The use of TEA resulted in higher total glycan signal and comparable results regardless of whether water or acid was used to stop the release and labeling reactions. As persons of skill will appreciate, samples of glycoconjugates often contain salts of various kinds which can form matrices upon addition of water or HC1. These matrices can affect the retention time of the labeled glycans and cause variations in the apparent results.

It is believed that the consistent results obtained using TEA regardless of the quenching agent are due, in whole or in part, to the reduction or avoidance of these matrix effects. Thus, bases which result in less variation when the release/labeling reaction is quenched by either water or acid are preferable to bases which result in more such variation.

Without wishing to be bound by theory, it is believed that the hydrogens of the amine group of a primary amine or of a secondary amine are available to attack the O-glycan and therefore can compete with the label in a one-pot release and label procedure. In contrast, tertiary amines, which by definition do not have available hydrogens attached to the nitrogen, likely acts more like a base than a nucleophile, do not attack the O-glycan, and therefore do not compete with the label. They therefore provide a surprisingly better combination of increased labeling and reduced formation of matrices upon quenching than that provided by either primary amines or secondary amines The label preferred for use in the inventive methods is 1-phenyl-3-methyl-5-pyrazolone ("PMP"), CAS number 89-25-8, which is commercially available from a number of suppliers, including Sigma-Aldrich. PMP has previously been used in procedures for labeling O-glycans, such as in the Zauner method discussed in the Background section. Glycans are labeled by PMP by Michael addition under alkaline conditions, to avoid the loss of sialic acids which could occur under acidic conditions. See, e.g. Ruhaak et al, Anal Bioanal Chem. 2010; 397(8): 3457-3481, the entirety of which is incorporated herein by reference. The PMP allows the glycans to be detected by mass spectrometry ("MS"), typically after the glycans have been separated by liquid chromatography. See, e.g., Lottova et al., J Amer. Soc. Mass. Spectrom., 2005; 16(5):683-96.

Figure 4:
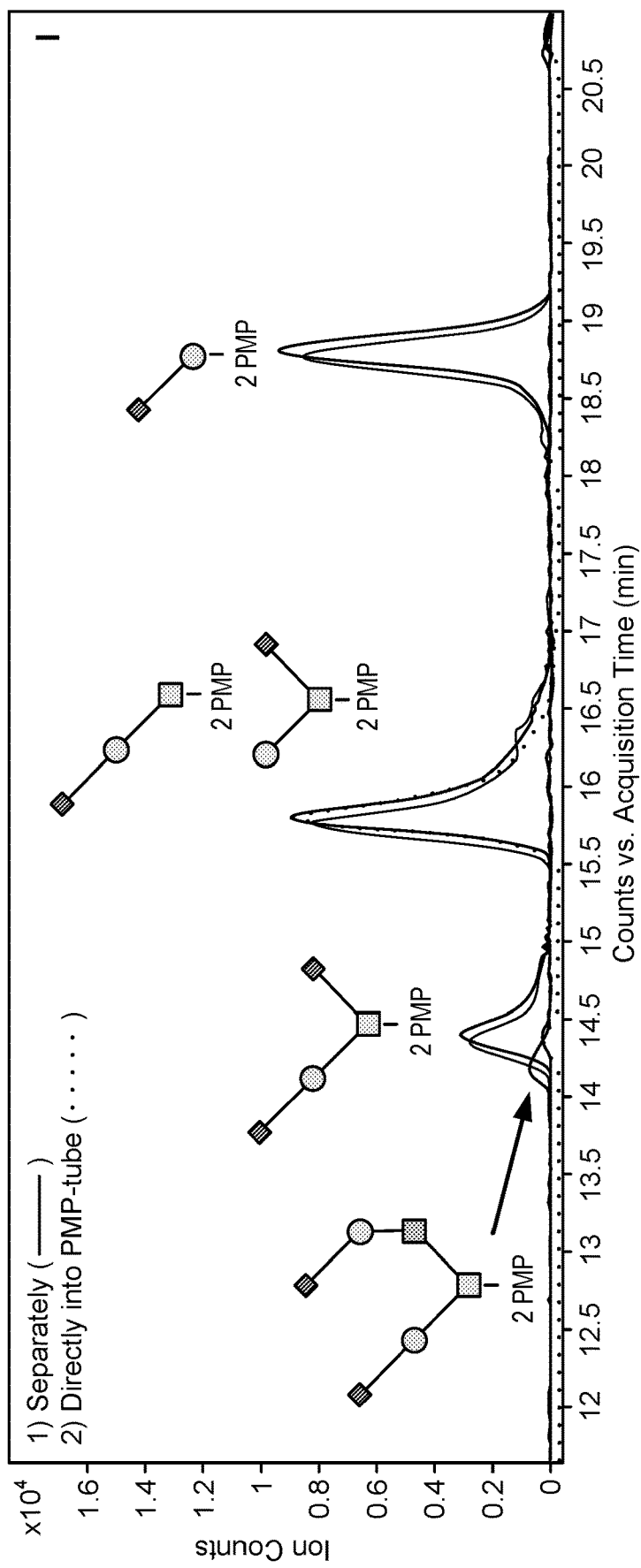
FIG. 4 presents graphs comparing two stock reagent solution preparation procedures: (1) addition of pre-mixed 2.9 M TEA to dry PMP or (2) addition of concentrated TEA to dry PMP followed by dilution with water. O-Glycans were obtained by reacting 40 µg glycoprotein in 0.5 M PMP dissolved in 1.45 M TEA at 80° C. Experiments were performed in triplicate using a 45 minute reaction time. Percentage value above each data bar corresponds to percent coefficient of variation. Error bars represent standard deviation. Graph I shows overlaid extracted ion chromatogram of target glycans (B, C, D, and E) and peeling product (A) for both reagent solution preparations. Graph II compares the absolute peak area abundances of each 15 glycan for both reagent solution preparations. Graph III compares the relative glycan profiles for both reagent solution preparations. For graphs II and III, bars with stripes designate studies using preparation method (1), above, while bars with dots designate studies using preparation method (2) above.
Figure 4:
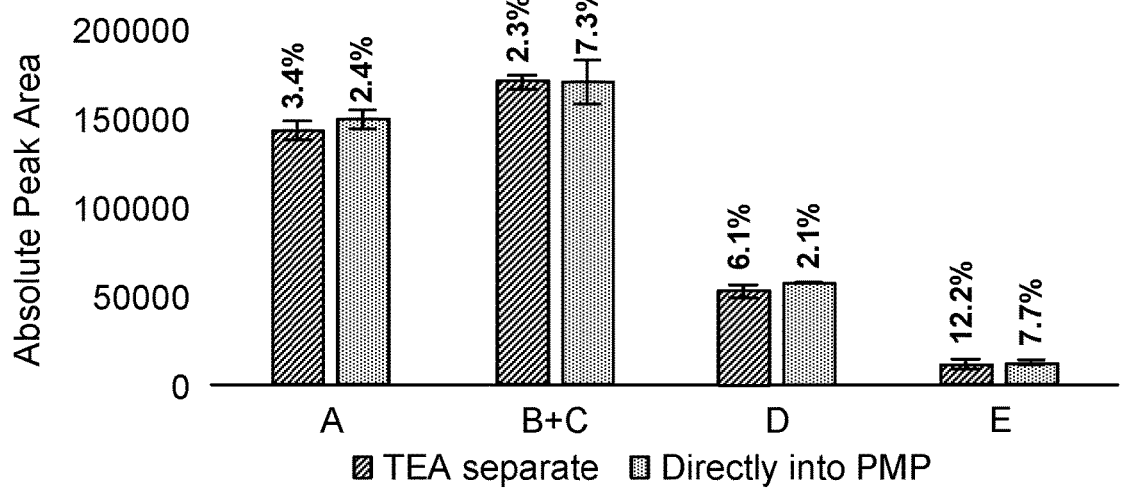
Figure 4:
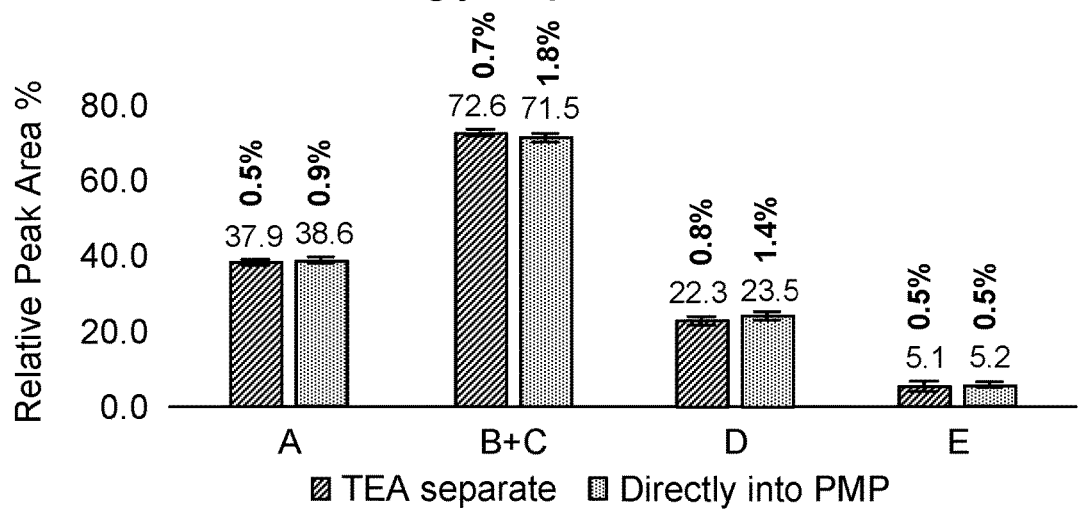

PMP is sold as a powder, and is reconstituted prior to use. In studies underlying the present disclosure, two methods of reconstitution were tested; in the first, a pre-mixed solution of TEA was added to dry PMP, and in the second, concentrated TEA was added to dry PMP, followed by dilution with water. As shown in FIG. 4 and further discussed in the Examples, the two methods gave equivalent results. In some preferred embodiments, the powdered PMP is weighed out to obtain the desired amount of PMP to be mixed, TEA is added as a liquid, and then added to a measured quantity of water calculated to result in a mixture with the desired molarity.

The effect of the concentrations of TEA and PMP to label O-glycans was also tested. TEA is an organic compound that is not highly soluble in water; at molarities of 3.9 or higher, it will not mix completely, resulting in some separation of the aqueous and organic phases. The studies reported herein investigated various starting stock solutions of TEA which, when equal amounts of solution containing the glycoprotein sample were added, would reduce the concentration by half (for example, a stock solution of 0.90M TEA would result in a solution of 0.45M TEA after the glycoprotein sample was added. For convenience of reference, the solution of TEA, PMP, and glycoprotein sample is sometimes referred to herein as the "release/labeling solution").

Figure 6:
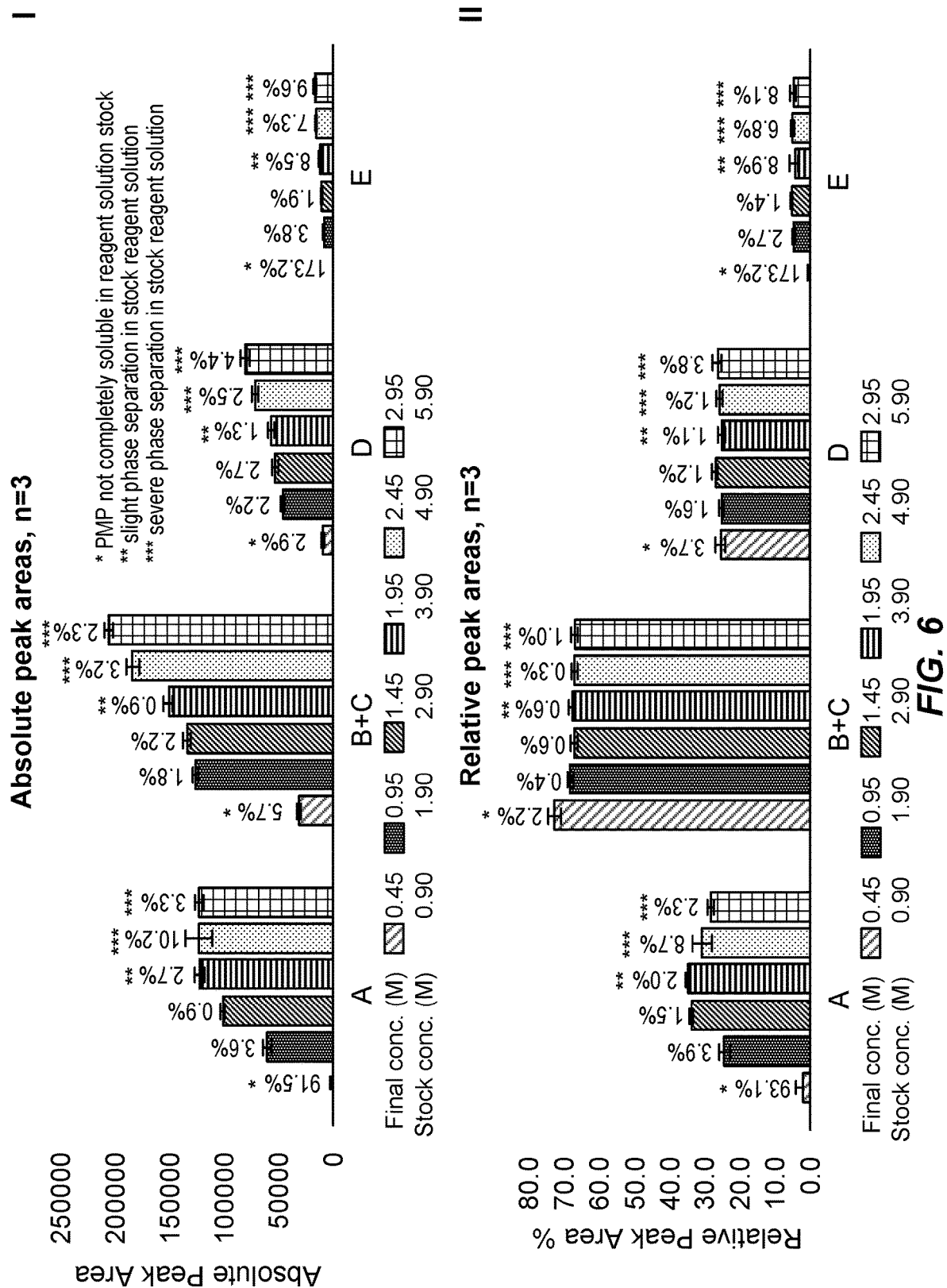
FIG. 6 graph I is a graph showing the absolute peak area of O-glycans reacted under identical conditions except for the indicated molarity of TEA. Coefficient of variation was determined to be ≤3.8% for each glycan for the 0.95 M and 1.45 M TEA conditions.

Studies were conducted to test concentrations of TEA that would be effective in providing alkaline conditions for releasing and labeling the O-glycans present on an exemplar glycoprotein. The studies showed that when a stock solution of 0.90M TEA was mixed with PMP, incomplete dissolution of the PMP resulted, while both 4.90M and 5.90M TEA solutions showed visible separation of the organic and aqueous phases. As shown in FIG. 6, higher final concentrations of TEA resulted in higher absolute amounts of O-glycans B+C and D being released, but the relative amounts of the glycans was relatively consistent for B+C, D and E across the range of TEA molarities tested and for O-glycan A was highest at molarities 1.45 and 1.95. Based on these results, it is believed that the molarity of the TEA in the release/labeling solution is preferably between 1.20 and 2, between 1.25 and 1.95, between 1.30 and 1.90, between 1.35 and 1.80, between 1.35 and 1.75, between 1.35 and 1.65, between 1.35 and 1.60, between 1.40 and 1.50, or about 1.45, with "about" in this context meaning 0.05M. In some embodiments, the molarity of the TEA in the release/labeling solution is 1.45M. That concentration was conveniently obtained by starting with a stock solution mixed to contain 2.9M TEA.

Figure 7:
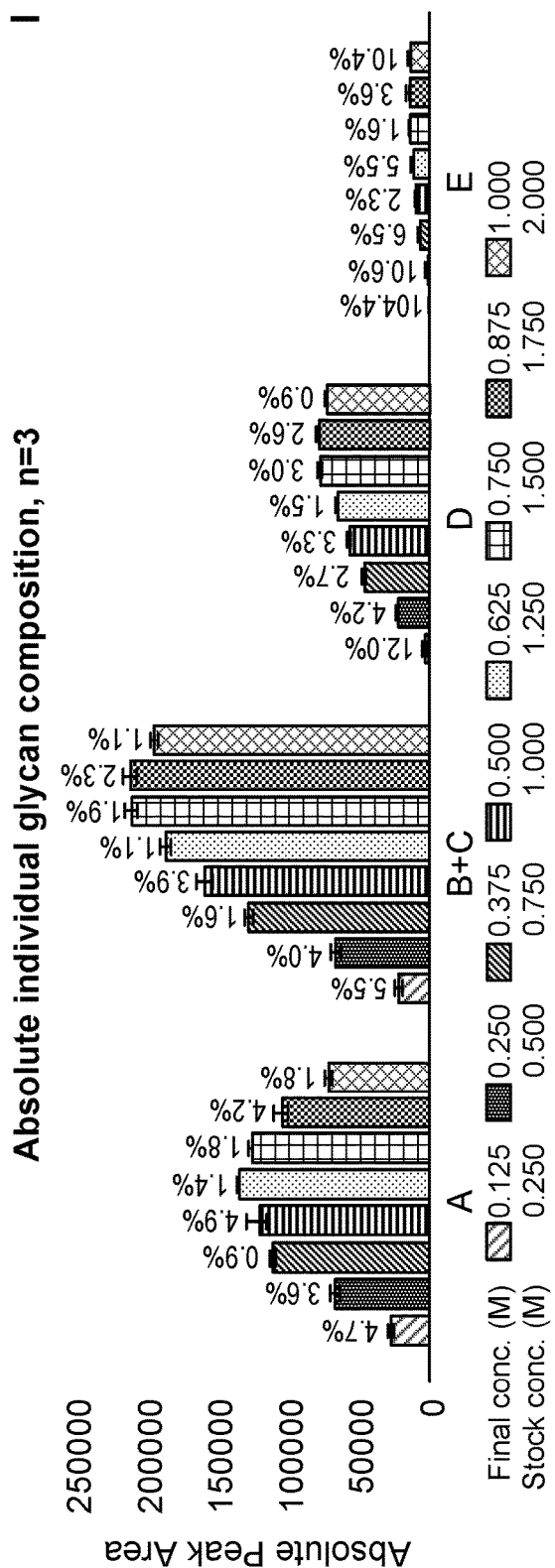
FIG. 7 graph I presents the absolute individual glycan composition of O-glycans released from 40 µg of glycoprotein in 1.45M TEA at 80° C. in the presence of different concentrations of PMP.
Figure 7:
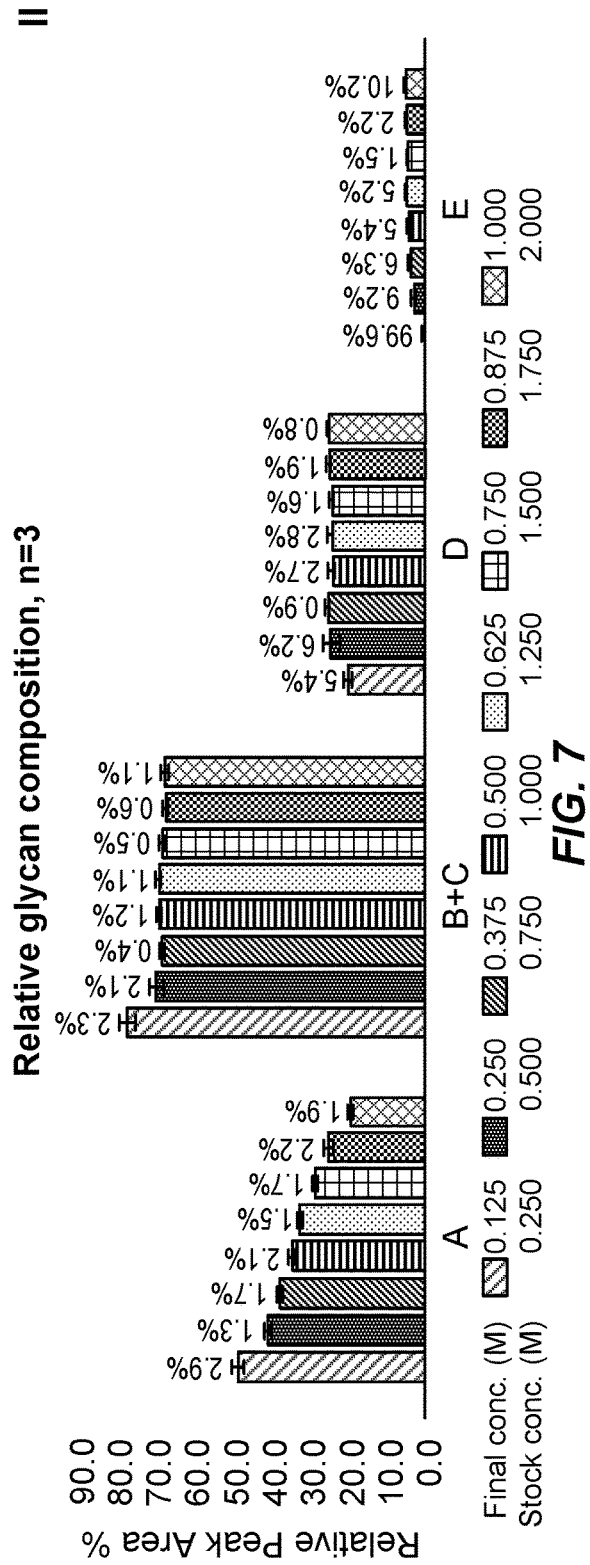

A further series of studies was conducted to determine concentrations of PMP that would be effective in labeling O-glycans in the presence of TEA. As persons of skill are aware, the higher the concentration of PMP, the more acidic the solution will become. Thus, the amount of PMP in the solution can be used to control the pH of the release/labeling solution. At more acidic pHs, lower amounts of O-glycans will be released from the glycoprotein for analysis, while at more basic pHs, the glycans are not labeled as well and can react further with the base and be destroyed. As shown in FIG. 7 and as further discussed in the Examples, accurate glycan profiles were obtained with final PMP concentrations ranging from 0.250M-1.000 M, with less than a 10% difference in the relative profile seen throughout this PMP range.

For ease of comparison, the remainder of experiments performed used a final reaction solution composed of 0.5 M PMP dissolved in 1.45 M TEA, which was prepared using a stock solution containing 1.0 M PMP dissolved in 2.9 M TEA. Based on these results, it is believed that the molarity of the PMP in the release/labeling solution is preferably between 0.20 and 1.25, between 0.25 and 1, between 0.30 and 0.90, between 0.35 and 0.80, between 0.35 and 0.75, 15 between 0.35 and 0.65, between 0.35 and 0.60, between 0.40 and 0.55, or about .50, with "about" in this context meaning 0.05M. In some embodiments, the molarity of the PMP in the release/labeling solution is 0.50M.

Glycoproteins, Glycopeptides, Peptidoglycans, and Proteoglycans

As discussed in the Introduction, the invention relates to compositions and methods for analyzing the O-glycans attached to a glycoprotein, glycopeptide, peptidoglycan, or proteoglycan of interest. The glycoprotein, glycopeptide, peptidoglycan, or proteoglycan of interest can be in dry form, or can be suspended in an aqueous solution. One advantage of the inventive methods compared to most prior techniques is that only very small amounts of the glycoprotein, glycopeptide, peptidoglycan, or proteoglycan of interest is needed for analysis. Studies reported in the Examples used glycoprotein sample sizes as low as 10 µg of glycoprotein, however, amounts as low as 4 µg have been tested. Typical sample sizes used in the studies were 40 µg. No matter the amount of glycoprotein used as the sample, 40 µL of water was added to suspend the glycoprotein. This suspension was then added to 40 µL of the TEA/PMP reaction mixture to achieve the desired final concentration of TEA and of PMP. Other amounts of water could, of course, be used to achieve a desired final concentration of TEA and of PMP. While these results were obtained using an exemplar glycoprotein, it is expected that similar results would also be obtained if a glycopeptide, peptidoglycan or proteoglycan is subjected to the same protocol. In some embodiments, the glycoconjugate is a glycoprotein or a glycopeptide.

Based on the results of the studies, it is believed that the amount of the selected glycoconjugate in the sample is preferably between 4 µg and 200 µg, between 5 µg and 150 µg, between 5 µg and 125 µg, between 5 µg and 110 µg, between 5 µg and 105 µg, between 5 µg and 100 µg , between 5 µg and 90 µg, between 5 µg and 80 µg, between 5 µg and 70 µg, between 10 µg and 60 µg, between 10 µg and 50 µg, or about 40 µg, with "about" in this context meaning ±10 µg . In some embodiments, the amount of the selected glycoconjugate in the sample is 40 µg.

The inventive methods are expected to work with glycoconjugates in which glycans are O-linked to amino acids. As noted above, such glycoconjugates include, in addition to glycopeptides and glycoproteins, peptidoglycans and proteoglycans. The inventive methods are not expected to work with glycolipids and lipopolysaccharides, which contain different chemistries at the attachment site.

Time and Temperature Conditions

Figure 9:
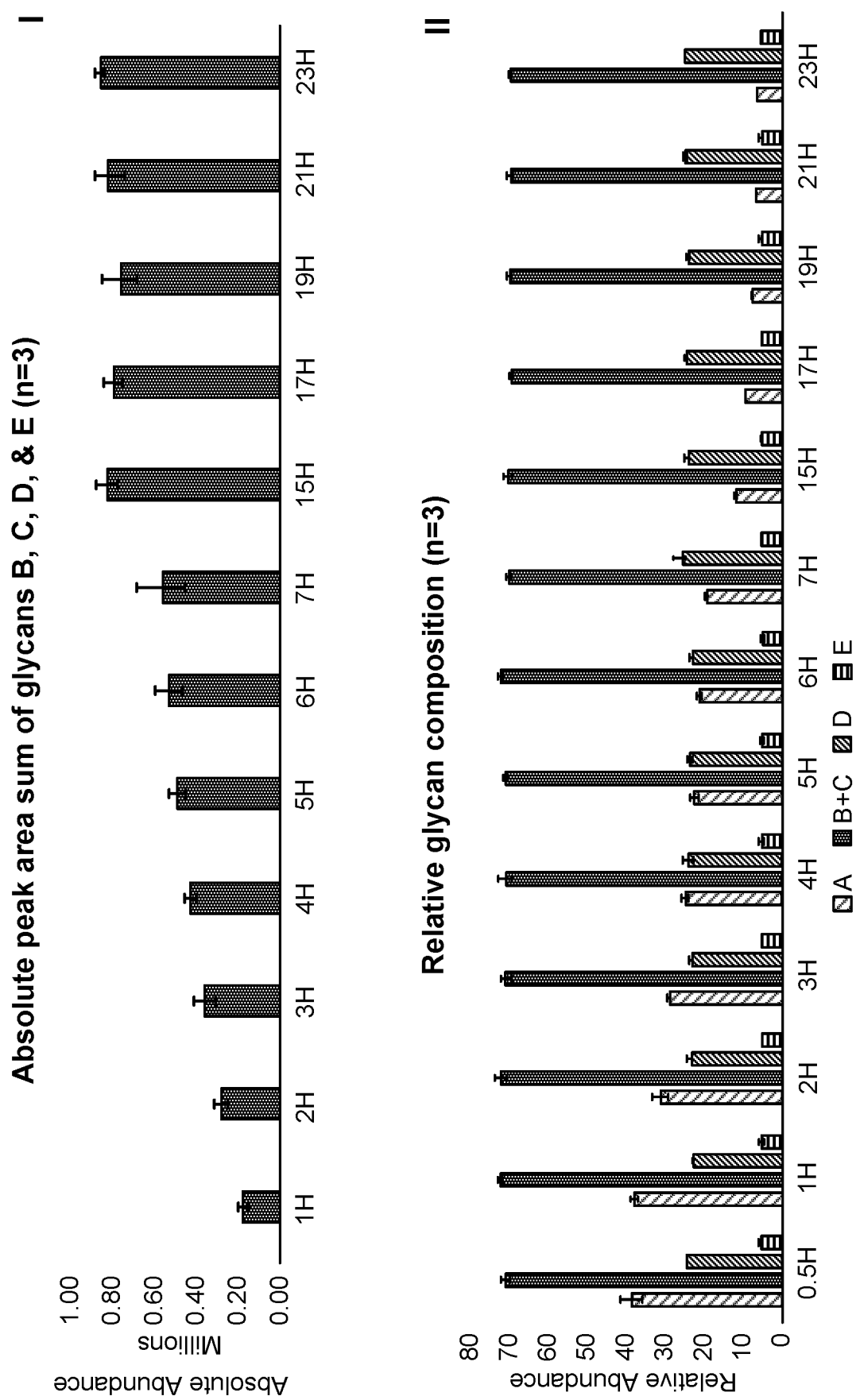
FIG. 9 graphs I and II present the results of studies to determine the time needed for maximum release of O-glycans from an exemplar glycoprotein. Graph I presents the absolute peak area sum of glycans B, C, D, and E released over different periods of time from 10 µg of glycoprotein in 0.5 PMP dissolved in 1.45M TEA at 80° C.
Figure 10:
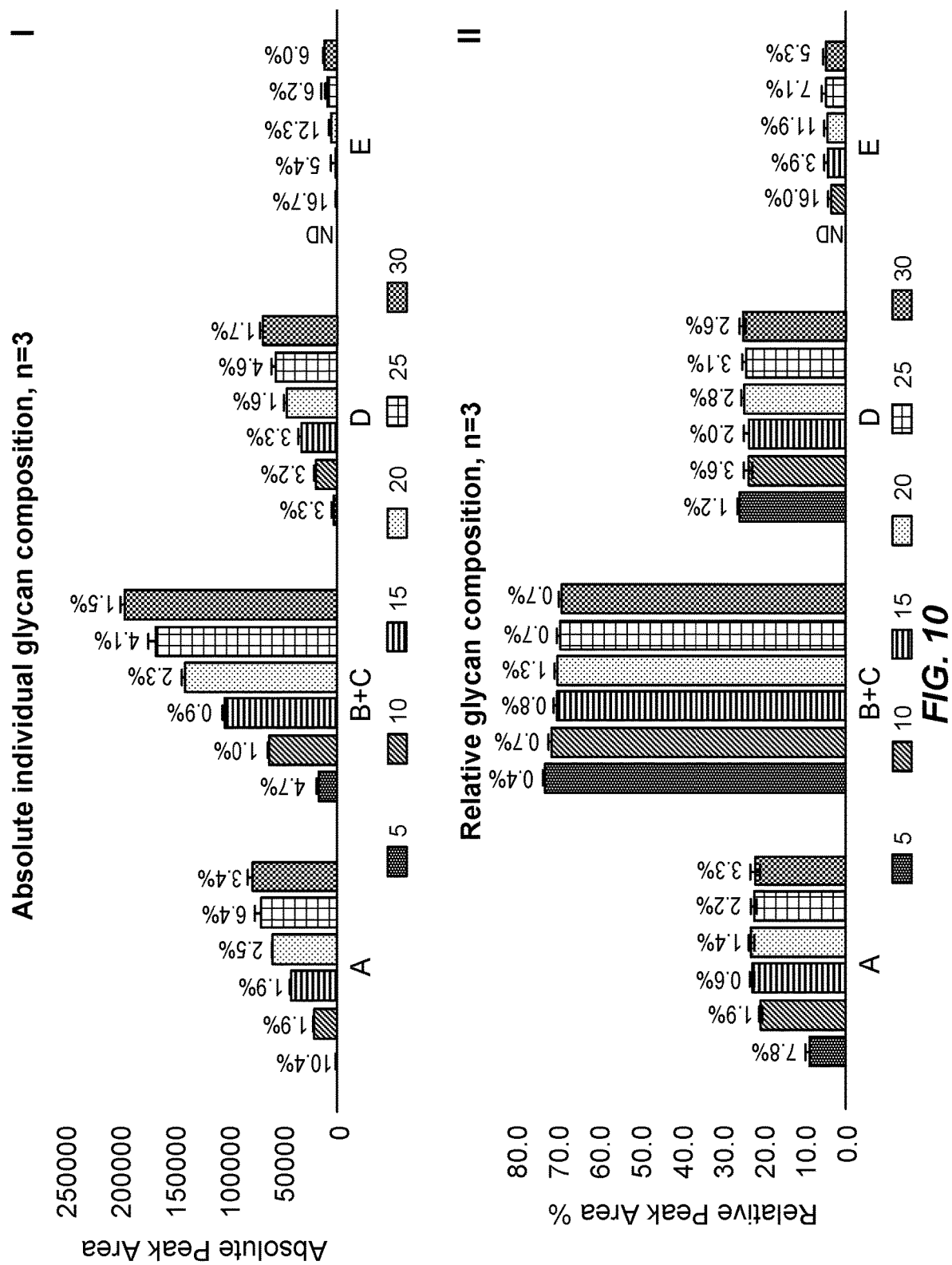
FIG. 10 presents the results of studies testing the minimal time needed to obtain an accurate glycan profile of O-glycans released from an exemplar glycoprotein by TEA and labeled by PMP.

As noted in the Introduction, one of the advantages of the inventive methods is the surprising speed with which a relative glycan profile of the O-glycans present on the selected glycoconjugate can be obtained. (As persons of skill understand, a relative glycan profile gives the relative proportion of each glycan that was released from a selected glycoconjugate, while an absolute glycan profile quantitates the amount of each glycan released.) As reported in the Examples, kinetic studies were performed to determine the minimal reaction time necessary to obtain accurate relative and absolute glycan profiles. As shown in FIGS. 9 and 10, these studies indicated that an accurate relative glycan profile of the exemplar glycoconjugate could be obtained with incubation times at 80° C. of as little as 10 minutes and was consistent at when samples were measured at timepoints up to 23 hours. Conversely, maximum glycan release was not seen until after 15 hours of incubation. Thus, if the practitioner wishes to determine the relative glycan profile of a glycoprotein of interest, for example, an incubation (reaction) time of as little as 10 minutes can be used, or of up to 23 hours, whereas practitioners wishing to quantitate O-glycans present on the glycoprotein of interest should choose a timepoint of about 15 hours, or of up to about 23 hours if desired. In some embodiments, the time for determining a relative glycan profile is 10 minutes ±1 minute. In some embodiments, the time for determining a relative glycan profile is 10 minutes ±30 seconds. In some embodiments, the time for determining a relative glycan profile is 10 minutes ±15 seconds. The time for quantitating the glycans present will likely be shorter if the container in which the samples are incubated is tightly capped and the reaction/labeling solution is incubated at 90-100 ° C.

In studies underlying the present invention, the release/labeling reaction was conducted at a variety of temperatures. As reported in the Examples, incubating the glycoprotein with TEA and PMP (sometimes referred to herein as the release/labeling reaction) at higher temperatures resulted in a greater release of O-glycans than did incubation at lower temperatures. The highest temperature tested was 100° C., which provided the greatest amount of glycan release.

As practitioners are aware, incubation at or close to 100° C. of samples in an aqueous solution will cause loss of volume due to water evaporation, thereby changing the concentration of the reactants in the solution. Solutions in which the release/labeling reaction is conducted at temperatures above 90° are therefore preferably performed in containers that are capped to reduce or eliminate loss of sample volume by evaporation. Applications in which it is not feasible to cap the container in which the reaction is being conducted, such as when the reaction container is a multi-well plate, are preferably performed at temperatures between 70-90° and more preferably at or around 80° C., with "about" in this context meaning ±5 ° C. In some embodiments, the temperature is between 71 and 89 ° C. In some embodiments, the temperature is between 72 and 88 ° C. In some embodiments, the temperature is between 73 and 87 ° C. In some embodiments, the temperature is between 74 and 87 ° C. In some embodiments, the temperature is between 75 and 86 ° C. In some embodiments, the temperature is between 76 and 85 ° C. In some embodiments, the temperature is between 77 and 84 ° C. In some embodiments, the temperature is between 77 and 83 ° C. In some embodiments, the temperature is between 78 and 82 ° C. In some embodiments, the temperature is between 79 and 81 ° C. In some embodiments, the temperature is 80 ° C. Typically, the container, such as a multi-well plate, is maintained at the desired temperature by simply placing the container on a heating plate or block. In other embodiments, the container may be placed in an apparatus configured to contain a temperature sensor and heating component responsive to the sensor. It is expected that persons of skill are well familiar with conventional laboratory equipment to maintain the temperature of a container and can select equipment suitable to raise the reaction container to the temperature selected by the practitioner and to maintain the reactants in the container at the selected temperature.

EXAMPLES

Example 1

This Example sets forth materials and methods used in the studies reported herein.

Samples and materials. Ammonium hydroxide ($NH_4OH$; 28.0-30.0%; $NH_3$ basis), dimethylamine ("DMA;" 40 wt. % in water), triethylamine ("TEA;">99.5%), 1-phenyl-3-methyl-5-pyrazolone ("PMP"), hydrochloric acid ("HCl;" ACS reagent 37%), and fetuin (fetal bovine serum) were purchased from Sigma-Aldrich (St. Louis, MO). Chloroform (HPLC-grade) and formic acid ("FA;" 99.5%+optima LC-MS grade) were purchased from Fisher Scientific (Hampton, NH). Acetonitrile ("ACN;" LC-MS grade) was purchased from Honeywell-Burdick & Jackson (Muskegon, MI). Nanopure water was used for all experiments.

Preparation of glycoprotein samples for analysis. The general protocol for release and labeling utilizes 40 µL solution containing glycoprotein. A stock glycoprotein solution was prepared at a concentration of 1 µg/µL in water and used for all experiments unless noted. Appropriate aliquots of the stock solution were used to prepare samples requiring more than 40 µg glycoprotein, dried by vacuum centrifugation, and resuspended in 40 µL water.

Preparation of stock reagent solution. A stock release/labeling solution consisting of 1.0 M PMP suspended in 2.9 M TEA was prepared. Two procedures can be used to prepare the reagent solution: 1) addition of pre-mixed 2.9 M TEA to dry PMP or 2) addition of concentrated TEA to dry PMP followed by dilution with water. The resulting solution was vortexed vigorously until complete dissolution was observed.

Reagent molarity assays. The experiments were performed by mixing an equal volume of glycoprotein sample with an equal volume of stock reagent solution prepared at a higher concentration. For evaluation of TEA molarities, respective stock reagent solutions were composed of 1.0 M PMP dissolved in 0.90-5.90 M TEA. These stock reagent solutions were diluted using glycoprotein sample to achieve a final reaction volume of 80 μL, final TEA molarities ranging from 0.45-2.95 M, and a final PMP molarity of 0.5. For evaluation of PMP molarities, respective stock reagent solutions were composed of 0.25-2.00 M PMP dissolved in 2.9 M TEA. These stock reagent solutions were diluted using glycoprotein sample to achieve a final volume of 80 μL, final PMP molarities ranging from 0.125-1.000 M, and a final TEA molarity of 1.45. Samples were reacted using the temperature, time, and cleanup procedures described below.

One-pot O-glycan release and labeling. An aliquot containing 40 μL of stock reagent solution was added to a PCR-tube followed by 40 μL of stock glycoprotein solution and homogenization via pipette. The PCR tube was capped, centrifuged, and reacted in a thermocycler set at 80° C. for 5 minutes to 15+ hours unless specified. Three to eight experimental replicates were performed for each study. After the reaction, the samples were centrifuged followed by addition of 80 μL 4° C. water, resulting in a final volume of 160 μL. The entire contents were transferred to an Eppendorf containing 160 μL chloroform. The mixture was vortexed, centrifuged, and the upper aqueous layer containing PMP-labeled O-glycans was collected and injected for analysis.

UHPLC/TOF MS Analysis. The PMP-labeled O-glycans were separated and analyzed on an Agilent 1290 Infinity II UHPLC system coupled to an Agilent 6530 time-of-flight mass spectrometer (Agilent Technologies, Inc., Santa Clara, CA). Analyses utilized 10 μL of sample injected onto an Agilent RRHD Eclipse Plus C18 column (2.1 mm×50 mm i.d., 1.8 μm particle size) and separated using a 25-minute binary gradient at a constant flow rate of 0.7 mL/min Mobile phase A: 0.1% FA/water (v/v); Mobile phase B: 100% ACN. The following elution gradient was used: 0.00-1.00 mins, 3.00% B; 1.00-1.01 mins, 3.00-5.90% B; 1.01-8.00 mins, 5.90-10.00% B; 8.00-22.00 mins, 10.00-15.83% B; 22.00-22.01 mins, 15.83-80.00% B; 22.01-23.00 mins, 80.00% B; 23.00-23.01 mins, 80.00-3.00% B; 23.01-25.00 mins, 3.00% B.

An Agilent jet stream electrospray ionization (AJS-ESI) source operated in positive ion mode was used to introduce sample into the mass spectrometer. Capillary and fragmentor voltages were set at 3000 V and 70 V, respectively. Skimmer and Octupole 1 RF voltages were set at 60 V and 600 V, respectively. Nebulizer pressure was set to 35 psi. Drying and sheath gas flow rates were set at 9 L/min and 10 L/min, respectively. Nitrogen drying and sheath gas temperatures were set at 150° C. and 300° C., respectively. Data acquisition from the LC-MS analysis was obtained using Agilent MassHunter Workstation Data Acquisition software Version B.08.00 and analyzed using Agilent MassHunter Qualitative Analysis Navigator software Version B.08.00.

Example 2

This Example describes how O-glycans released from an exemplar 0-glycoprotein was analyzed by mass spectrometry in studies employing an embodiment of the inventive methods.

Bovine fetuin was used as an exemplar O-glycosylated protein. O-Glycans present in fetuin are composed of the following four possible monosaccharides: N-acetylneuraminic acid (NeuAc), galactose (Gal), N-acetylgalactosamine (GalNAc), and N-acetylglucosamine (GlcNAc). FIG. 1 displays the known four O-glycan structures present in fetuin: NeuAc-α(2→3)-Gal-β(1→3)-GalNAc (compound B), Gal-β(1→3)-[NeuAc-α(2→6)-]-GalNAc (compound C), NeuAc-α(2→3)-Gal-β(1→3)-[NeuAc-α(2→6)-]-GalNAc (compound D), and NeuAc-α(2→3)-Gal-β(1→4)-GlcNAc-β(1→6)-[NeuAc-α(2→3)-Gal-β(1→3)-]-GalNAc (compound E). An additional structure, NeuAc-α(2→3)-Gal (compound A), is formed by degradation of glycan compounds B, C, D, and E is a result of the peeling reaction, a common by-product when generating O-glycans by beta-elimination.

Intact O-glycans released from the glycoprotein undergo immediate reducing-end derivatization resulting in the attachment of two PMP molecules. By immediately labeling the reducing-end of the released glycan, the peeling reaction is thwarted. Additionally, the added hydrophobicity of PMP along with nitrogens present in the pyrazolone rings allow for increased 15 retention by reverse-phase C18 LC and improved ionization during the electrospray process, respectively. After the reaction, neutralization and removal of excess PMP reagent is performed by liquid-liquid extraction prior to analysis for improved column binding capacity. Analysis of the derivatized structures by LC-MS provides two-dimensions of data which include both retention time and accurate mass which are used to accurately identify the target compounds. The PMP-derivatized O-glycans are identified by detection of the protonated ion mass which is equal to the sum of the monosaccharide mass, the additional mass of two PMP molecules, and the mass of a proton ([M+330+H]+).

Figure 2:
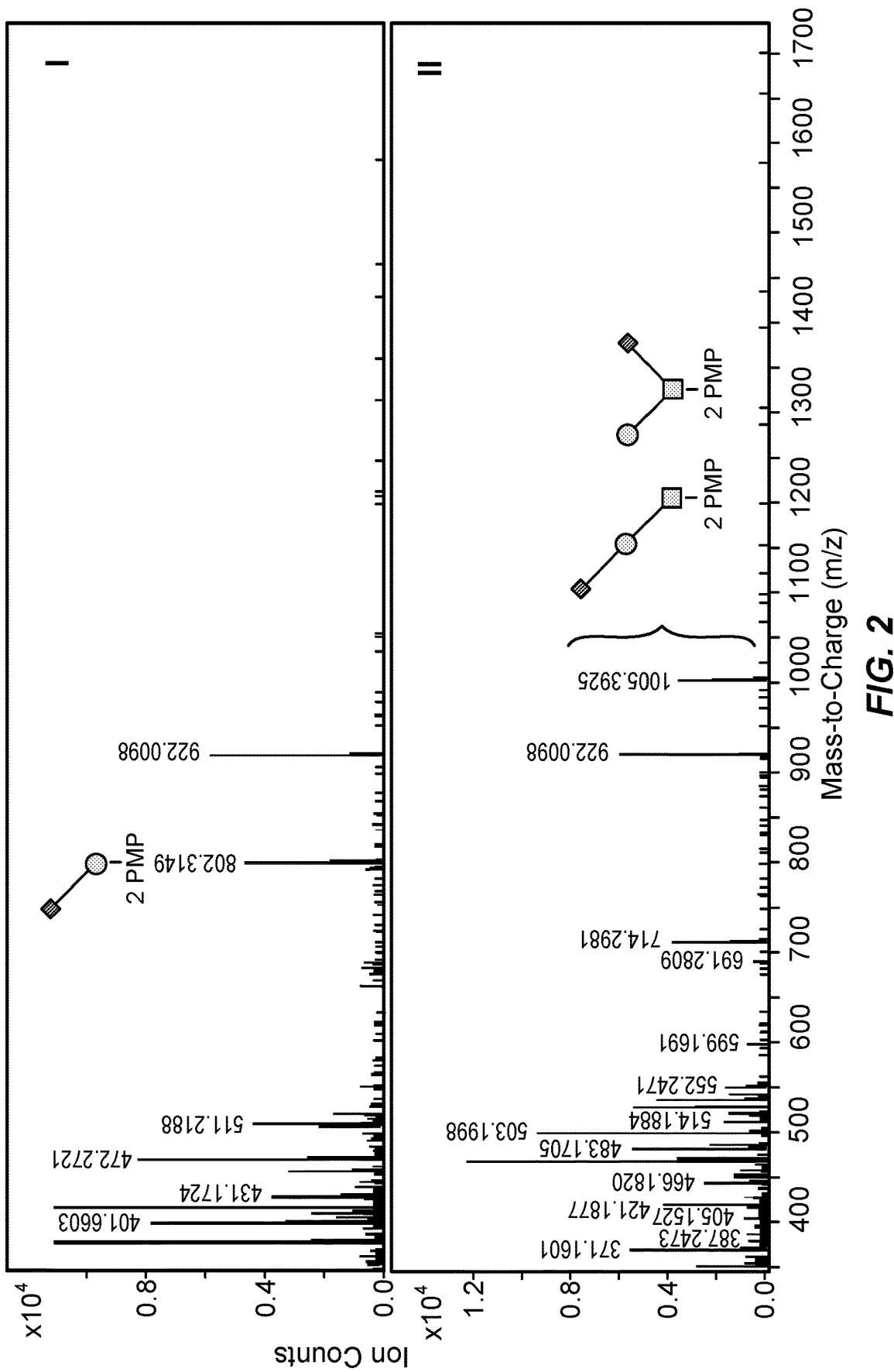
FIG. 2 shows the mass spectra for 1-phenyl-3-methyl-5-pyrazolone ("PMP")-derivatives of compounds A (designated "I" in the Figure), B ("II"), C ("II"), D ("III"), and E ("IV"). As can be seen in FIG. 1, compounds B and C are composed of the same sugars, although they are arranged differently. The two compounds therefore have the same mass and have the same mass spectra.
Figure 2:
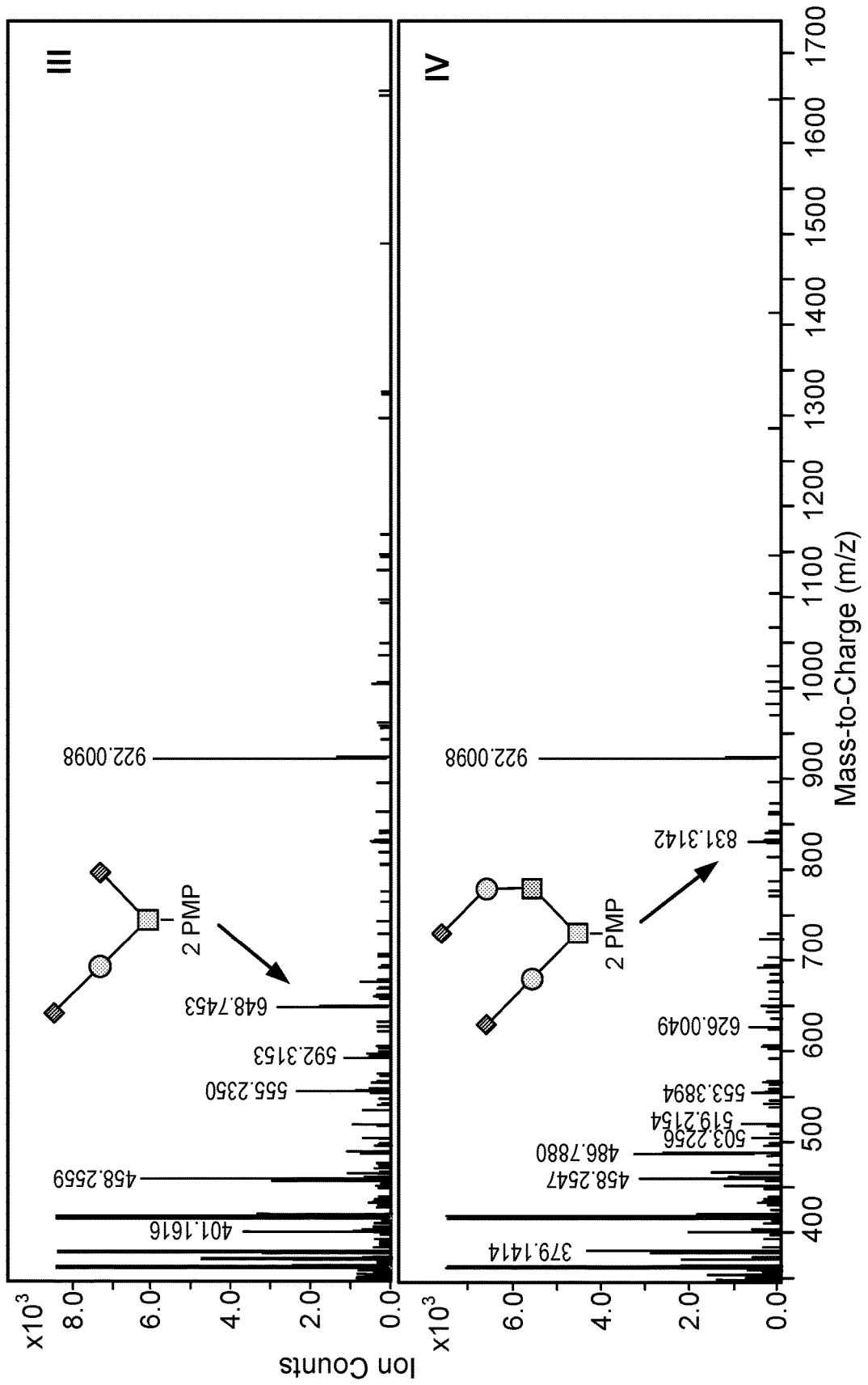

The protonated ion masses observed for derivatized compounds A, B, C, D, and E are m/z 803.3147, m/z 1005.3941, m/z 1005.3941, m/z 1296.4895, and m/z 1661.6217, respectively. Due to an increase in ionization efficiency, highly abundant doubly-charged species ([M+330+2H]$^2$+corresponding to derivatized compounds A, B, C, D, and E are additionally observed and are represented by m/z 401.6607, m/z 503.2004, m/z 503.2004, m/z 648.7481, and m/z 831.3142, respectively. It should be noted that compounds B and C are structural isomers, and therefore have the same mass. FIG. 2I-IV displays general MS spectra obtained for PMP-derivatized compounds A, B, C, D, and E by this method Absolute and relative quantitative information for compounds A, B, C, D, and E was obtained by integration of their peak areas and correspond to the abundance of singly-charged and doubly-charged ion species as a function of retention time. Peak areas for both singly-charged and doubly-charged ion species were summed to determine absolute abundance. Because the parent glycan source for the peeling product is unable to be determined, separate equations were used to calculate the respective relative abundances for compound A and compounds B, C, D, and E and are given by Eq. 1 and Eq. 2, respectively.

$$\text{Compound } A \text{ relative peak area } \% = \quad \text{[Eq. 1]}$$
$$\left(\frac{\text{Peak area for compound } A}{\text{Sum of peak areas for compounds } A, B, C, D, \text{ and } E}\right) \times 100$$

$$\text{Compound } B, C, D, \text{ or } E \text{ relative peak area } \% = \quad \text{[Eq. 2]}$$
$$\left(\frac{\text{Peak area for compound } B, C, D, \text{ or } E}{\text{Sum of peak areas for compounds } B, C, D, \text{ and } E}\right) \times 100$$

Example 3

This Example describes the evaluation of potential release reagents for use in some embodiments of the inventive methods.

Several bases (NH$_4$OH, TEA, and DMA) were evaluated for their ability to release intact O-glycans from bovine fetuin at elevated temperature in the presence of PMP. O-Glycans were obtained by reacting 40 μg glycoprotein in 0.5 M PMP dissolved in either 1.45 M NH$_4$OH, TEA, or DMA at 80° C. for 45 minutes. Criteria for base selection for further method 15 development include comparison of absolute glycan abundance at a specific time-point at a set temperature in addition to minimized sample preparation difficulty and observed matrix effects during analysis when either water or HCl was used for neutralization.

Figure 3:
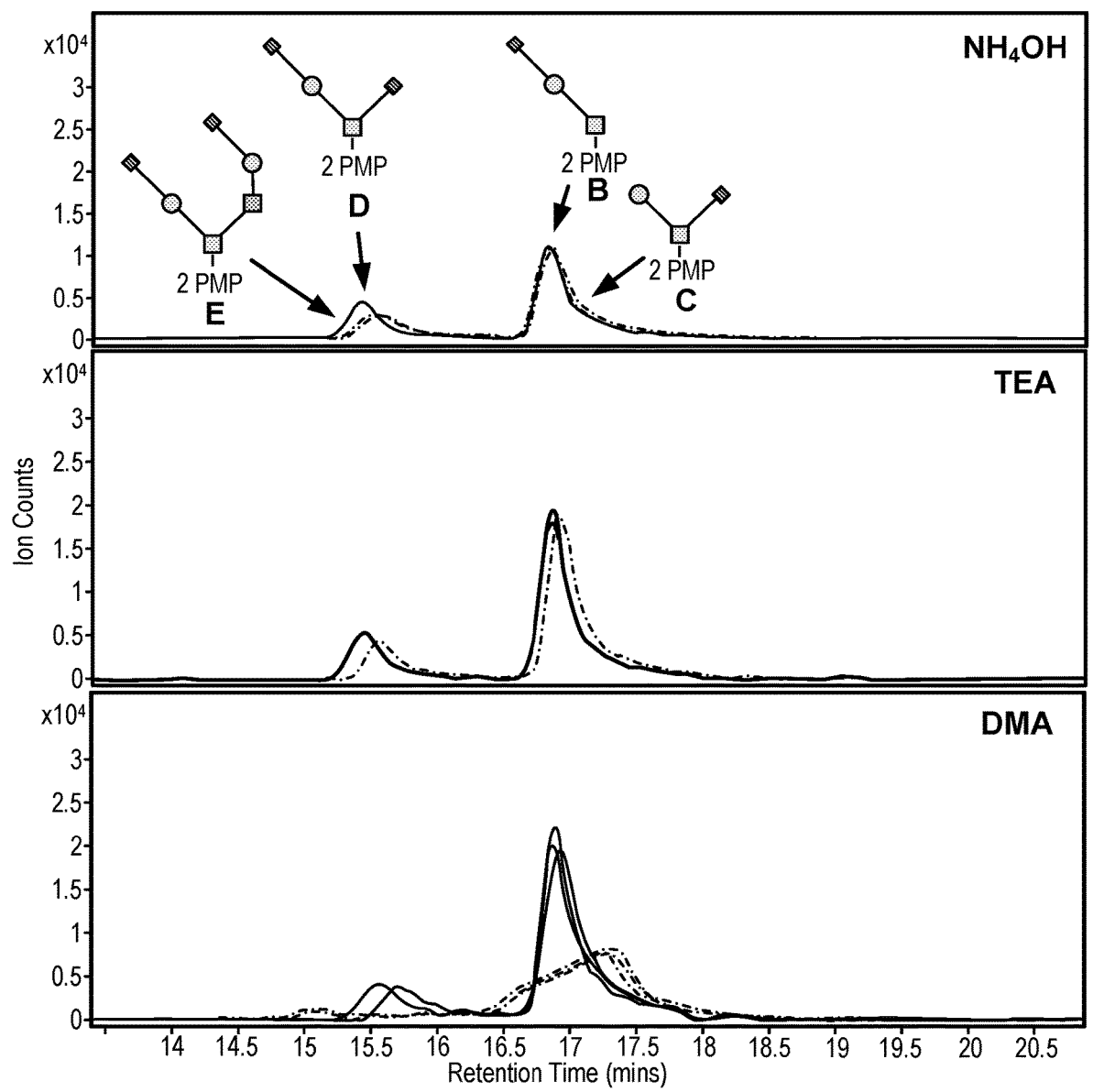
FIG. 3 presents graphs showing merged extracted ion chromatograms of compounds B, C, D, and E. The chromatographs show the matrix effects observed after neutralization with either water (solid traces) or HCl (dashed traces) for NH$_4$OH (top), TEA (middle), and DMA (bottom).

FIG. 3 displays merged extracted ion chromatograms of target compounds B, C, D, and E when neutralizing NH4OH, TEA, and DMA with either water or HCl post-reaction. Significant differences were observed in the absolute abundances and chromatography when neutralizing each base with either water or HC1. For example, addition of HCl to the NH$_4$OH treated sample caused a slight shift of the retention time to a later time-point with respect to the samples neutralized using water. Regardless of whether water or HCl was used, absolute glycan abundances were found to be the lowest for NH$_4$OH in comparison to the other bases. Neutralization of DMA with water resulted in significant signal suppression in addition to peak retention shifting. However, neutralization using HCl provided better peak resolution and signal. Due to such variability, studies of DMA were discontinued. Samples prepared using TEA resulted in higher total glycan signal in comparison to the other bases and only a slight retention time shift to a later time-point was observed when using HCl. Based on these results, TEA was selected for further method development as it would provide a reproducible and robust result for preparing O-glycans from glycoproteins in samples that contain salts.

Example 4

This Example reports the investigation of methods to prepare TEA-PMP solutions for use in O-glycan release procedures.

Notable phase separation was observed during preparation of the pre-mixed 2.9 M TEA solution used to dissolve PMP. To address concerns regarding reagent solution preparation reproducibility, two reagent solution preparation procedures were evaluated: 1) addition of pre-mixed 2.9 M TEA to dry PMP or 2) addition of concentrated TEA to dry PMP followed by dilution with water. In both cases, the same final concentration of 1.0 M PMP in 2.9 M TEA was prepared. As illustrated by FIGS. 4I-III, both procedures produce derivatized O-glycans with high reproducibility. Coefficient of variation values for absolute glycan abundances and relative glycan profile were <12.2% and <1.8%, respectively, demonstrating the reproducibility and robustness of the method. Additionally, there was less than 10% difference in both the 15 absolute abundance and relative profile between the two procedures. Accordingly, it was considered that either workflow could be used for preparing the stock reagent solution. As the second procedure is less cumbersome to execute, however, it was the one used in further evaluations of O-glycan release.

Example 5

Figure 5:
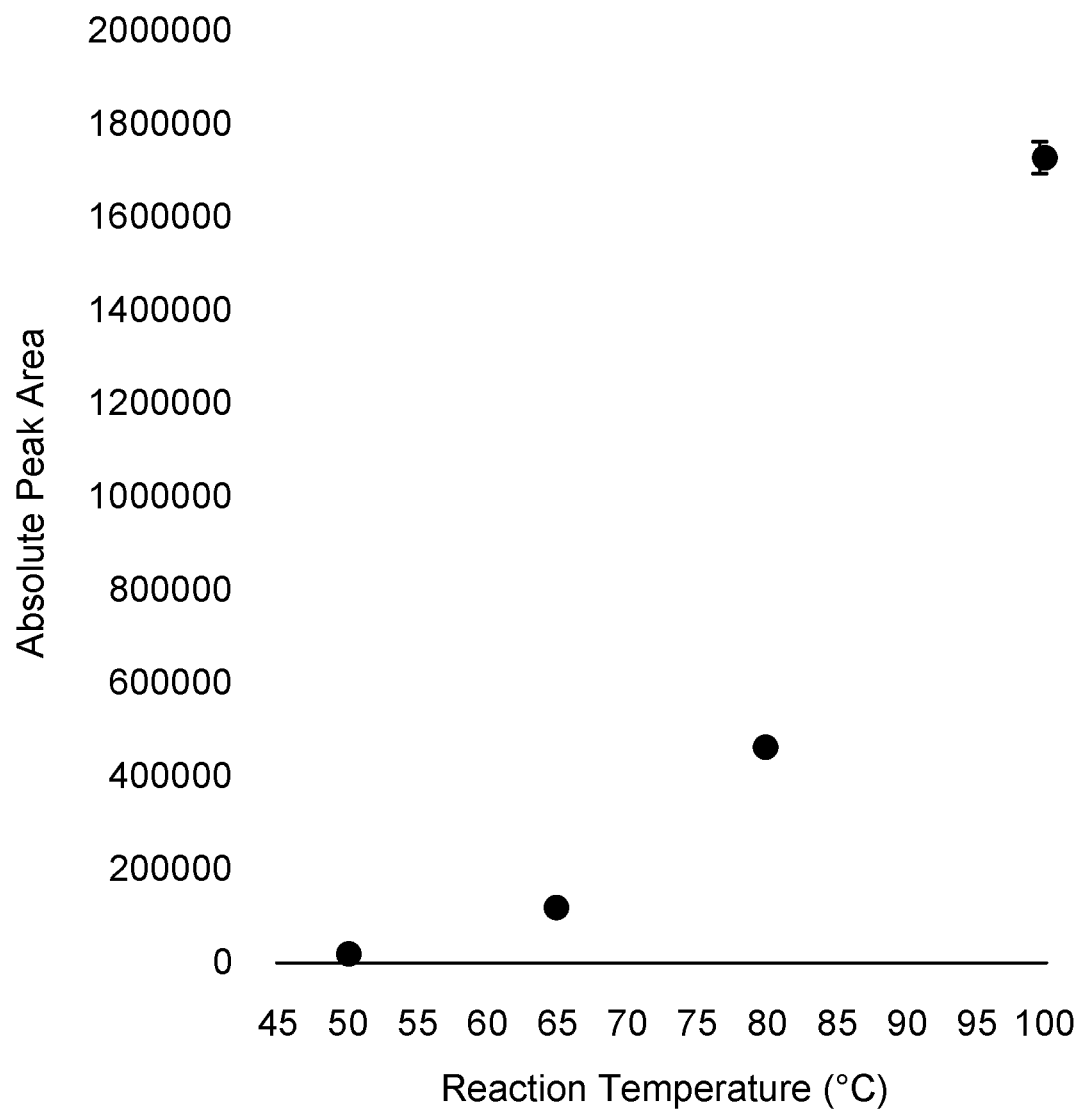
FIG. 5 is a graph presenting the sum of glycan abundances as a function of temperature. Reactions were performed by reacting 40 µg glycoprotein in 0.5 M PMP dissolved in 1.45 M TEA at 50° C., 65° C., 80° C., and 100° C., respectively, for 45 minutes. Samples were prepared in triplicate. Error bars represent standard deviation.

This Example reports the investigation of temperatures suitable for use in O-glycan release procedures Extensive studies involving reaction thermodynamics, chemistries, and kinetics were performed to maximize O-glycan release while maintaining minimal peeling by-product. Chemistries in this case are defined as molarities of TEA and PMP, reaction volumes, and sample glycoprotein amount. Reaction thermodynamics was examined using TEA to select for a reaction temperature for further studies. FIG. 5 displays the summed absolute glycan peak areas as a function of temperature. It was expected and observed that the yield of derivatized O-glycans increase as a function of temperature. While temperature greatly affects the yield of these structures, the method becomes limited by the robustness and volume capacity of the reaction vessel. For example, if the reaction was conducted at 100° C. in absence of a weighted or tightly sealable lid, evaporation of the sample would occur, resulting in incomplete production of the target structures. The temperature 80° C. was selected as a temperature suitable for either single or multi-well plate applications for use in either a thermocycler or a standard hot-plate system.

Example 6

This Example reports the investigation of concentrations of reagents for use in O-glycan release procedures.

Various TEA and PMP molarities were investigated to determine the working range for generating O-glycans while achieving the desired relative profile composition at high yield. As shown in FIG. 6I, the yield of target compounds B, C, D, and E increases as a function of TEA concentration. Less that a 10% difference in the relative profile was obtained regardless of the TEA concentrations tested, implying that each condition is sufficient to produce an accurate glycan profile (FIG. 6II). However, one caveat is difficulty in preparation of the stock reagent solution for the conditions involving 0.90, 4.90, and 5.90 M TEA. Incomplete PMP dissolution was observed for the stock 0.90 M TEA solution while both the 4.90 M and 5.90 M TEA solutions had observable organic/aqueous phase separation. Of the concentrations tested, the 15 one which produced the maximum yield of target compounds without incomplete PMP dissolution was obtained using a stock reagent solution of 1.0 M PMP dissolved in 2.90 M TEA.

Next, the working PMP molarity range was evaluated to maximize the labeling efficiency of the O-glycans after being released by TEA. FIG. 7 displays the effect of varying PMP molarities when performing the reaction. As shown in FIG. 7I, the yield of target compounds B, C, D, and E increased as a function of PMP concentration and a maximum was observed for the 0.875 M PMP condition. However, a decrease in glycan yield was observed for the tested PMP concentration above 0.875 M. Without wishing to be bound by theory, the decreased glycan yields at the concentration tested above 0.875 is believed to be due to PMP buffering the final solution to a lower pH.

Based on the results of these studies, it was determined that the working range of final PMP concentrations to obtain an accurate glycan profile was 0.250-1.000 M (FIG. 7II). Less than a 10% difference was seen in the relative profile obtained for this PMP range. For the remainder of experiments presented, a final reaction solution composed of 0.5 M PMP dissolved in 1.45 M TEA was used and prepared from a stock solution containing 1.0 M PMP dissolved in 2.9 M TEA.

Example 7

This Example reports the investigation of the effects of varying the volumes of reaction containers in O-glycan release procedures.

Figure 8:
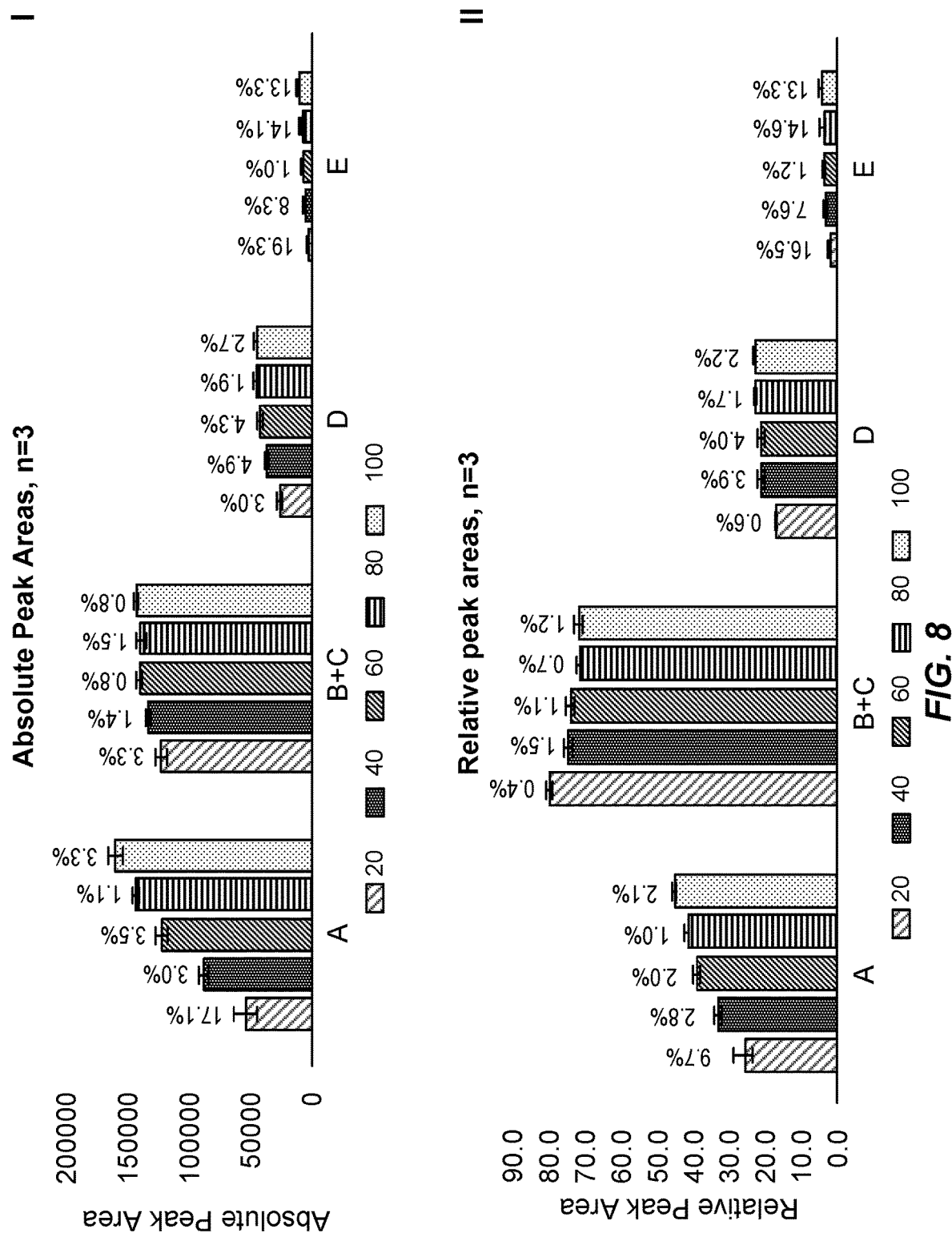
FIG. 8 presents the results of studies to test the effect of differences in reaction volume in release and labeling of O-glycans from 40 µg of an exemplar glycoprotein.

Various reaction volumes were evaluated to determine the working range for producing derivatized O-glycans. FIG. 8 displays the absolute and relative peak areas for derivatized O-glycans obtained by performing the reaction at 80° C. for 30 minutes. For target compounds B, C, D, and E, maximum yield was achieved when using either 80 µL to 100 µL of reagent solution (FIG. 8I). However, each volume condition was observed to produce the target structures with a difference of less than 10% in both absolute and relative profile (FIG. 8II) compositions. Coefficient of variation values of <19.3% and <16.5% were determined for the absolute and relative profile compositions, respectively. Based on these results and limitations in the volume capacity of the reaction vessel, 80 µL was chosen as the reagent volume for further studies. While these results were obtained using dry fetuin, it should be noted that the reaction can also be performed using suspended glycoprotein and the use of dry glycoprotein was viable but optional.

Example 8

This Example reports the investigation of O-glycan release procedures as a function of time.

Kinetic studies were performed to determine the amount of time necessary to achieve maximum glycan yield and accurate glycan profiles. To do this, absolute glycan abundances and relative glycan profiles for a time-range spanning from minutes to overnight were examined FIG. 9 displays the absolute abundance and relative glycan profiles from 10 µg of fetuin. As shown in FIG. 9I, signal for the glycans increased as a function of time and plateaued from 15-23 hours. Less than a 10% difference in absolute abundance was found between the 15-23 hour time-points, suggesting that complete glycan liberation had been achieved at 15 hours. A constant accurate relative glycan profile was achieved for each of the specified time-points (FIG. 9II), demonstrating that glycoproteins can be accurately characterized in as little as 30 minutes. Furthermore, the results suggest that the use of larger amounts of glycoprotein would require a longer reaction time to achieve maximum release.

An additional kinetic study was performed to determine the minimal reaction time necessary to achieve an accurate glycan profile. FIG. 10 displays a survey of the glycan profiles obtained when performing the reaction using a final reaction composition of 0.875 M PMP and 1.45 M TEA with 40 µg glycoprotein. It was expected and observed that maximum release of glycans would not be achieved in the time-range examined, however, compounds A, B, C, D, and E were identified in each of the time-points with the exception of 5 minutes (FIG. 10I). Time-points greater than 5 minutes was required in order to detect the least abundant O-glycan present in fetuin. As for glycan profiling, each time-point ranging from 10-30 minutes were found to accurately generate an accurate glycan composition (FIG. 10II) with less than a 10% difference when performing the reaction within 10-30 minutes.

Example 9

This Example reports the investigation of the suitability of the one-pot O-glycan release procedure for use in a multi-well format.

Embodiments of the one-pot method was further evaluated for its ability to be performed in a multi-well plate format, such as a standard 96-well plate. The ability to use embodiments of the one-port method in multi-well plate applications allows rapid sample batch preparations and throughout.

Figure 11:
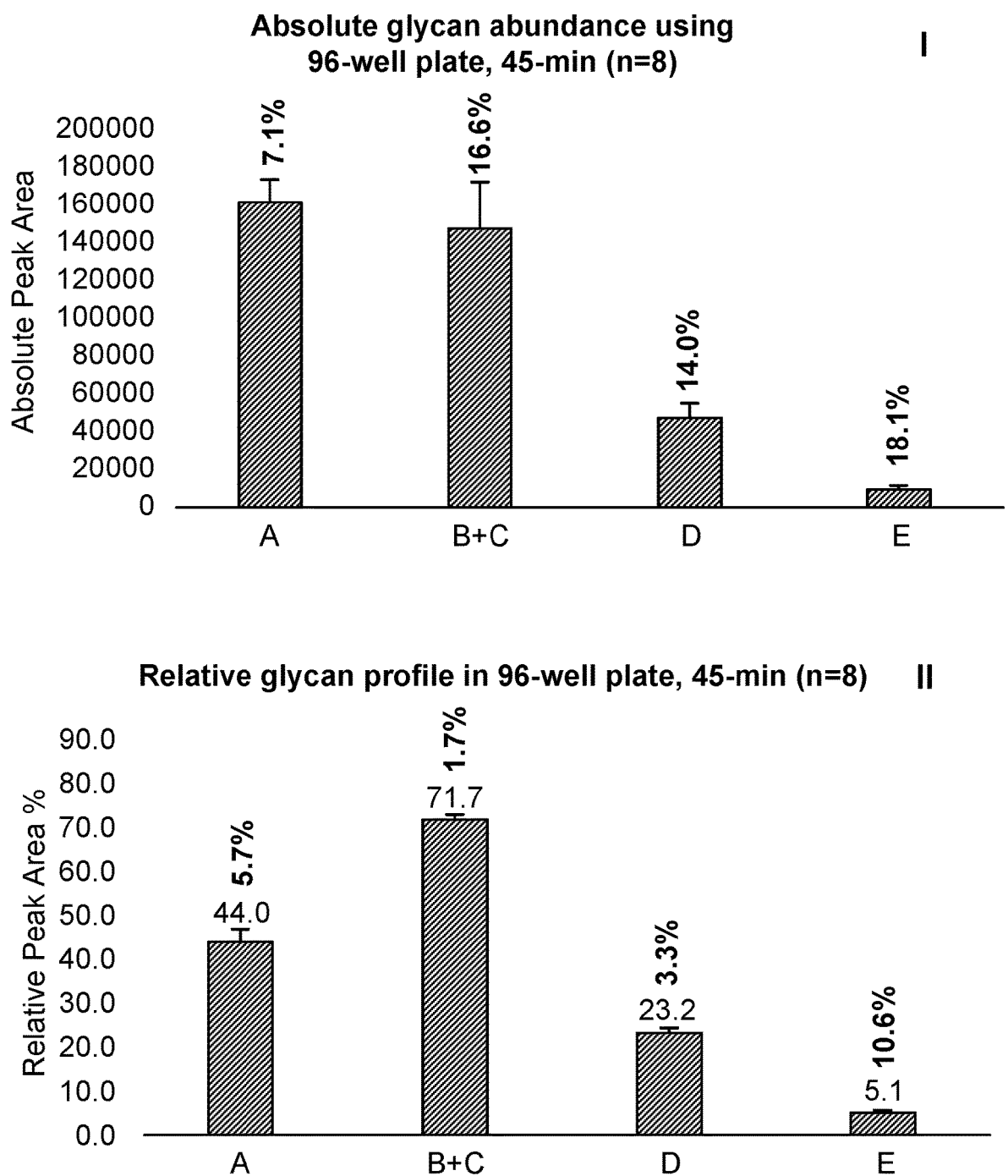
FIG. 11 presents the results of studies testing the ability of one-pot release and labeling of O-glycans to be performed in a multi-well plate format, with the well of a 96-well plate used as an exemplar. Graph I presents the absolute peak area sum of glycans A, B+C, D, and E released and labeled in a well of a 96-well plate. released over different periods of time from 10 µg of glycoprotein in 0.5 PMP dissolved in 1.45M TEA at 80° C. Both graphs: Samples were prepared in triplicate and a reaction time range from 30 minutes to 23 hours was used as the reaction time. Error bars represent standard deviation.

FIG. 11 illustrates both the absolute glycan and relative glycan profile obtained when performing an embodiment of the one-pot method in a 96-well plate format. An impressive coefficient of variation of <10.6% was found for each glycan in FIG. 11II and demonstrates the reproducibility, robustness, and applicability of the approach for the high-throughput generation of O-glycans.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. A method for releasing, labeling, and, optionally, analyzing, O-glycans present on a selected glycoconjugate of interest, said method comprising: incubating in a container said selected glycoconjugate of interest in an aqueous solution comprising 1.20M-2M triethylamine ("TEA"), and 0.20M to 1.25M 1-phenyl-3-methyl-5-pyrazolone ("PMP") at a temperature of 70-100° C. for a time between about 10 minutes and 23 hours.

2. The method of claim 1, wherein said selected glycoconjugate of interest is a glycoprotein or a glycopeptide.

3. The method of claim 1, wherein said TEA is present in said solution at 1.45M±0.1M.

4. The method of claim 1, wherein said PMP is present in said solution at 0.40M-0.55M.

5. The method of claim 1, wherein said TEA is present in said solution at 1.45M and said PMP is present in said solution at 0.50M.

6. The method of claim 5, further wherein said selected glycoconjugate is present in said solution in an amount of 40 µg±10µg.

7. The method of claim 1, further wherein said aqueous solution contains no more than 5% hydrazine.

8. The method of claim 1, further wherein said aqueous solution contains no hydrazine.

9. The method of claim 1, wherein said time of incubation is about 10 to about 30 minutes.

10. The method of claim 1, wherein said time of incubation is 15-23 hours.

11. The method of claim 1, wherein said temperature at which the solution is incubated is at or above 90° C. and the container is capped.

12. The method of claim 1, wherein said temperature at which the solution is incubated is 70-90° C.

13. The method of claim 1, further comprising analyzing said released, labeled O-glycans.

14. A composition comprising a selected glycoconjugate of interest and an aqueous solution comprising 1.20M-2M triethylamine ("TEA"), and 0.20M to 1.25M 1-phenyl-3-methyl-5-pyrazolone ("PMP").

15. The composition of claim 14, further wherein said selected glycoconjugate of interest is a glycoprotein or a glycopeptide.

16. The composition of claim 14, further wherein said TEA is present in said solution at 1.45M±0.1M and wherein said PMP is present in said solution at 0.40M-0.55M.

17. The composition of claim 14, further wherein said aqueous solution contains no more than 5% hydrazine.

18. The composition of claim 14, further wherein said aqueous solution contains no hydrazine.

19. A kit for releasing, labeling, and, optionally, analyzing, O-glycans present on a selected glycoconjugate of interest, said kit comprising: (a) a container, (b) triethylamine ("TEA"), and (c) 1-phenyl-3-methyl-5-pyrazolone ("PMP").

20. The kit of claim 19, further comprising (d) one or more O-glycans in known amounts for use as standards.

* * * * *